(12) United States Patent
Kurozuka et al.

(10) Patent No.: US 8,182,093 B2
(45) Date of Patent: May 22, 2012

(54) IMAGE PROJECTION DEVICE INCLUDING DETERMINING DISPLAYABLE REGION

(75) Inventors: Akira Kurozuka, Osaka (JP); Hironori Tomita, Nara (JP); Osamu Kajino, Osaka (JP); Hiroshi Obi, Nara (JP); Masanari Mohri, Hyogo (JP)

(73) Assignee: Panasonic Corporation, Osaka (JP)

( * ) Notice: Subject to any disclaimer, the term of this patent is extended or adjusted under 35 U.S.C. 154(b) by 898 days.

(21) Appl. No.: 12/067,196

(22) PCT Filed: Sep. 21, 2006

(86) PCT No.: PCT/JP2006/318739
§ 371 (c)(1),
(2), (4) Date: Mar. 18, 2008

(87) PCT Pub. No.: WO2007/034875
PCT Pub. Date: Mar. 29, 2007

(65) Prior Publication Data
US 2009/0147224 A1      Jun. 11, 2009

(30) Foreign Application Priority Data

Sep. 21, 2005   (JP) ................................. 2005-273319
Sep. 21, 2005   (JP) ................................. 2005-273321

(51) Int. Cl.
*G03B 21/26*   (2006.01)
(52) U.S. Cl. ................. 353/37; 353/50; 353/70; 353/98
(58) Field of Classification Search .................... 353/37, 353/42, 121, 122, 70, 50, 85, 86, 87, 98; 348/744, 739; 345/156
See application file for complete search history.

(56) References Cited

U.S. PATENT DOCUMENTS

| | | | |
|---|---|---|---|
| 6,002,505 A | 12/1999 | Kraenert et al. | |
| 2003/0010888 A1* | 1/2003 | Shimada et al. | ........... 250/201.1 |
| 2004/0165154 A1* | 8/2004 | Kobori et al. | .................... 353/69 |
| 2005/0035943 A1* | 2/2005 | Kojima | .......................... 345/156 |
| 2005/0270492 A1* | 12/2005 | Vlahos | ............................ 353/30 |

FOREIGN PATENT DOCUMENTS

| | | |
|---|---|---|
| JP | 2994469 | 10/1999 |
| JP | 2004-254145 | 9/2004 |
| JP | 2005-031526 | 2/2005 |
| JP | 2005-173097 | 6/2005 |

OTHER PUBLICATIONS

International Search Report for corresponding Application No. PCT/JP2006/318739 dated Oct. 31, 2006.
Form PCT/ISA/237 and partial English translation.

* cited by examiner

Primary Examiner — Francis M Legasse, Jr.
(74) Attorney, Agent, or Firm — Renner, Otto, Boisselle & Sklar, LLP

(57) ABSTRACT

An image projection apparatus according to the present invention includes a light source for outputting laser light and a mirror section for reflecting and projecting the laser light having been output from the light source, and displays an image with at least a portion of the projected laser light. The image projection apparatus includes a detection section for detecting at least a portion of the laser light returning from a projection direction of the laser light, and a calculation section for determining an image displayable region based on the detected light. The mirror section reflects at least a portion of the laser light returning from the projection direction of the laser light so as to be led into the detection section.

25 Claims, 19 Drawing Sheets

(a)

(b)

IMAGE PROJECTION DEVICE INCLUDING DETERMINING DISPLAYABLE REGION

TECHNICAL FIELD

The present invention relates to an image projection apparatus for projecting laser light to display an image, and in particular to a technique of improving the safety of an image projection apparatus.

BACKGROUND ART

When a human comes into a projection light path between a projector for projecting an image onto a screen and the screen and turns his or her face toward the projecting side, there is a danger in that the projection light may stimulate his or her eyes. Therefore, a method has been proposed in which a detection section for detecting the presence or absence of an object in the projection light path and a control section for controlling radiation power are provided in an image projection apparatus, and when an object is detected in the projection light path, the radiation power is reduced to prevent danger.

For example, Patent Document 1 discloses an image projection apparatus which monitors a projection region with an electromagnetic radiation sensor, a thermal radiation sensor, a pyroelectric sensor, a temperature sensor, or the like, and when an object exists in the projection region, switches to an operation mode which is made harmless to humans.

Moreover, Patent Document 2 discloses an image projection apparatus which monitors a projected image with a camera, extracts a region in which a human is present, and causes any image to be masked in that region. With this apparatus, the radiation power only needs to be limited in the region where human presence is determined within the projection region, thus permitting an image to be still displayed in any other region.

Moreover, an image projection apparatus which projects laser light to display an image (also referred to as a laser projector) is under development. Laser light which is output from a laser light-emitting element has a higher color purity than that of light which is output from a lamp, and thus allows for an improved color reproduction. In addition, the optics can be downsized and also the power consumption can be reduced, so that an image projection apparatus can be realized which is power-thrifty and small-sized.

Since laser light is available for scanning in a thinly constricted state, a mirror element or the like can be used to perform a two-dimensional scanning with laser light, whereby an image is displayed. Such a scanning-based laser projector displays an image by modulating the intensity of laser light, and thus is even more power-thrifty than any usual projector that uses two-dimensional image displaying devices, e.g., a liquid crystal panel or a DMD (Digital Micromirror Device). Moreover, downsizing of the apparatus can also be achieved because there is no need for illumination optics for uniformly illuminating two-dimensional image devices.

Thus, a scanning-based laser projector is mountable even in a small-sized mobile device. Thus, large-scale displaying can be enjoyed even with a mobile phone or the like, in which a large-sized display would be difficult to be mounted.

[Patent Document 1] Japanese Patent No. 2994469
[Patent Document 2] Japanese Laid-Open Patent Publication No. 2004-254145

DISCLOSURE OF INVENTION

Problems to be Solved by the Invention

Conventional image projection apparatuses need to separately incorporate a sensor(s) for detection and a camera(s) for image monitoring as a mechanism for detecting objects and people, and therefore are expensive and only permit downsizing to a certain extent.

For laser applications such as laser projectors, permissible radiation powers are defined under safety standards. Since an adequate brightness cannot be ensured in the range which is safe for the human eyes, there is a need for a technology which can enhance radiation power while ensuring safety.

The present invention has been made in view of the aforementioned problems, and aims to provide an image projection apparatus which is capable of displaying with safety and adequate brightness, while realizing downsizing and cost reduction.

Means for Solving the Problems

An image projection apparatus according to the present invention is an image projection apparatus having: a light source for outputting laser light; and a mirror section for reflecting and projecting the laser light having been output from the light source, wherein the image projection apparatus displays an image with at least a portion of the projected laser light, characterized in that the image projection apparatus comprises: a detection section for detecting at least a portion of the laser light returning from a projection direction of the laser light; and a calculation section for determining an image displayable region based on the detected light, wherein, the mirror section reflects at least a portion of the laser light returning from the projection direction of the laser light so as to be led into the detection section.

In one embodiment, a modulation section for generating a modulation signal with which to modulate the laser light in accordance with an image signal is further comprised, wherein, the light source outputs the laser light having been modulated in accordance with the modulation signal; and the calculation section compares an intensity of the detected light against the modulation signal to determine the image displayable region.

In one embodiment, for the image displayable region, the modulation section generates a modulation signal for causing an image which is in accordance with the image signal to be displayed; and for a region other than the image displayable region, the modulation section generates a modulation signal for projecting laser light for detection purposes with which to detect an obstacle.

In one embodiment, when the calculation section determines that image displaying is permissible in at least a part of the region other than the image displayable region, the modulation section generates a modulation signal for causing an image which is in accordance with the image signal to be displayed in the at least partial region determined as permitting image displaying.

In one embodiment, the laser light for detection purposes is projected in a dot pattern.

In one embodiment, the mirror section displays an image by performing a two-dimensional scanning with the laser light; the calculation section performs the process of determining an image displayable region for each scanning line; and the modulation section allows a result of the determination process to be reflected on a modulation of the laser light corresponding to a subsequent scanning line.

In one embodiment, the mirror section displays an image by performing a two-dimensional scanning with the laser light; and the modulation section modulates the laser light corresponding to a scanning line at an uppermost end of an image frame based on the image displayable region determined when displaying an immediately previous image frame.

In one embodiment, a maximum radiation power of the laser light is a radiation power such that an energy that enters a human eye when the laser light scans the eye is equal to or less than a safe level which is defined by a safety standard.

In one embodiment, a maximum radiation power of the laser light is a radiation power such that an energy that enters a human eye when the laser light scans the eye is equal to or less than a safe level which is defined by a safety standard; and a radiation power of the laser light for detection purposes which is projected in the dot pattern is equal to or greater than a radiation power of the laser light for image displaying purposes.

In one embodiment, at boot of the image projection apparatus, the light source projects the laser light for detection purposes before displaying a image.

In one embodiment, the light source outputs laser light of each color of n primary colors (where n is a natural number equal to or greater than 3); and the light source independently outputs the laser light of each color as the laser light for detection purposes.

In one embodiment, the calculation section determines the image displayable region based further on an intensity of light which is detected by the detection section in a blanking period during which the light source is not lit.

In one embodiment, the blanking period is a horizontal blanking period.

In one embodiment, the blanking period is a vertical blanking period.

In one embodiment, based on the detected light, the calculation section measures a distance between a projection target onto which the laser light is projected and the image projection apparatus; and based on the distance, the calculation section detects a substantially planar region in the projection target, and determines the substantially planar region as the image displayable region.

In one embodiment, the calculation section divides into a plurality of subregions a plane corresponding to the projection target as obtained based on the distance, and determines whether each subregion is substantially planar or not.

In one embodiment, the calculation section calculates an imaginary plane within the subregion and determines the subregion to be substantially planar when a level of variance in distance between the imaginary plane and the projection target is equal to or less than a predetermined value.

In one embodiment, a storing section for retaining position information of the projection target within a subregion determined to be substantially planar is further comprised, wherein, when a difference between a newly measured distance and the position information is equal to or greater than a predetermined value, the calculation section re-determines the subregion whose said difference is equal to or greater than the predetermined value to be a non-planar region; and the light source suspends image displaying in the subregion whose said difference is equal to or greater than the predetermined value.

In one embodiment, the calculation section groups those subregions which are determined to be substantially planar into a plurality of groups, such that, among the subregions which are determined to be substantially planar, any subregion that is positioned coplanar is classified into one group, and displays an image in the subregions belonging to a group having a largest area.

In one embodiment, a storing section for retaining position information of the projection target within a subregion determined to be substantially planar is further comprised, wherein, the position information is updated every time the distance is newly measured; and the light source begins image displaying in the subregion determined to be substantially planar only if a position indicated by the position information remains unchanged for a predetermined period of time.

In one embodiment, the calculation section calculates a profile of the projection target based on the distance, and removes, from the profile, rises and falls that are smaller than predetermined rises and falls.

In one embodiment, the calculation section calculates a curvature of the projection target based on the distance; and the light source does not perform image displaying in a region in which the curvature falls within a predetermined range.

In one embodiment, the calculation section calculates a profile of the projection target based on the distance, and removes, from the profile, rises and falls that are smaller than predetermined rises and falls; and the calculation section calculates a curvature of the projection target based on the profile.

In one embodiment, a temperature measurement section for measuring a temperature of a surface of the projection target is further comprised, wherein, when the temperature in the image displayable region falls within a predetermined range, the light source suspends image displaying in a region in which the temperature falls within the predetermined range.

In one embodiment, the temperature measurement section measures a temperature of the surface of the projection target in a period during which laser light to be output for measuring the distance is stopped.

Effects of the Invention

According to the present invention, a mirror section for image displaying purposes serves also as a mechanism for detecting an image displayable region. As a result, the number of parts is reduced so that a cost reduction is realized, and downsizing of the apparatus can also be realized. Moreover, the calculation section distinguishes between an image displayable region which is determined as not containing any humans and any other region determined as containing a human(s). Safety can be ensured by not displaying an image in any region determined as containing a human(s). In addition, it is possible to display an image with strong light in the image displayable region, which is determined as not containing any humans, whereby a bright image displaying can be realized.

In one embodiment, an image displayable region is detected by using laser light for displaying an image. By merely providing in the apparatus a detection section for detecting reflected light intensity and a calculation section in addition to the constituent elements for image displaying purposes, it becomes possible to perform detection of an image displayable region. Thus, a further cost reduction and downsizing of the apparatus can be realized. According to the present invention, since it is not necessary to separately provide a sensor(s) for detection and a camera(s) for image monitoring in the apparatus as a mechanism for detecting objects and people, an image projection apparatus can be realized which is small-sized and inexpensive and yet enables bright image displaying in a safe manner.

In one embodiment, the operation of detecting humans is continued in both the image displayable region and any other region. As a result, when a human has intruded the image displayable region, image displaying in the intruded region can be immediately suspended. On the other hand, when humans are no longer detected from any region other than the image displayable region, image displaying in that region can be resumed.

In one embodiment, the laser light for detection purposes is projected in a dot pattern. As a result, the operation of detecting humans can be performed while ensuring safety by reducing the amount of light that might enter human eyes.

In one embodiment, the process of determining an image displayable region is performed for each scanning line, and a result of this process is reflected on a modulation of the laser light corresponding to a subsequent scanning line. Thus, by performing the process for each scanning line, image displaying and non-displaying can be switched with minimum processing time. Moreover, by allowing the processing result to be reflected on the subsequent scanning line, the amount of light that might enter human eyes can be further reduced.

In one embodiment, the calculation section determines the image displayable region based further on an intensity of light which is detected by the detection section in a blanking period during which the light source is not lit. By detecting light other than reflected light of the laser light, it becomes possible to precisely determine the image displayable region under various conditions, e.g., brightness or darkness of the place of use and the state of an object in the projection region.

DESCRIPTION OF THE REFERENCE NUMERALS

Figure 1:
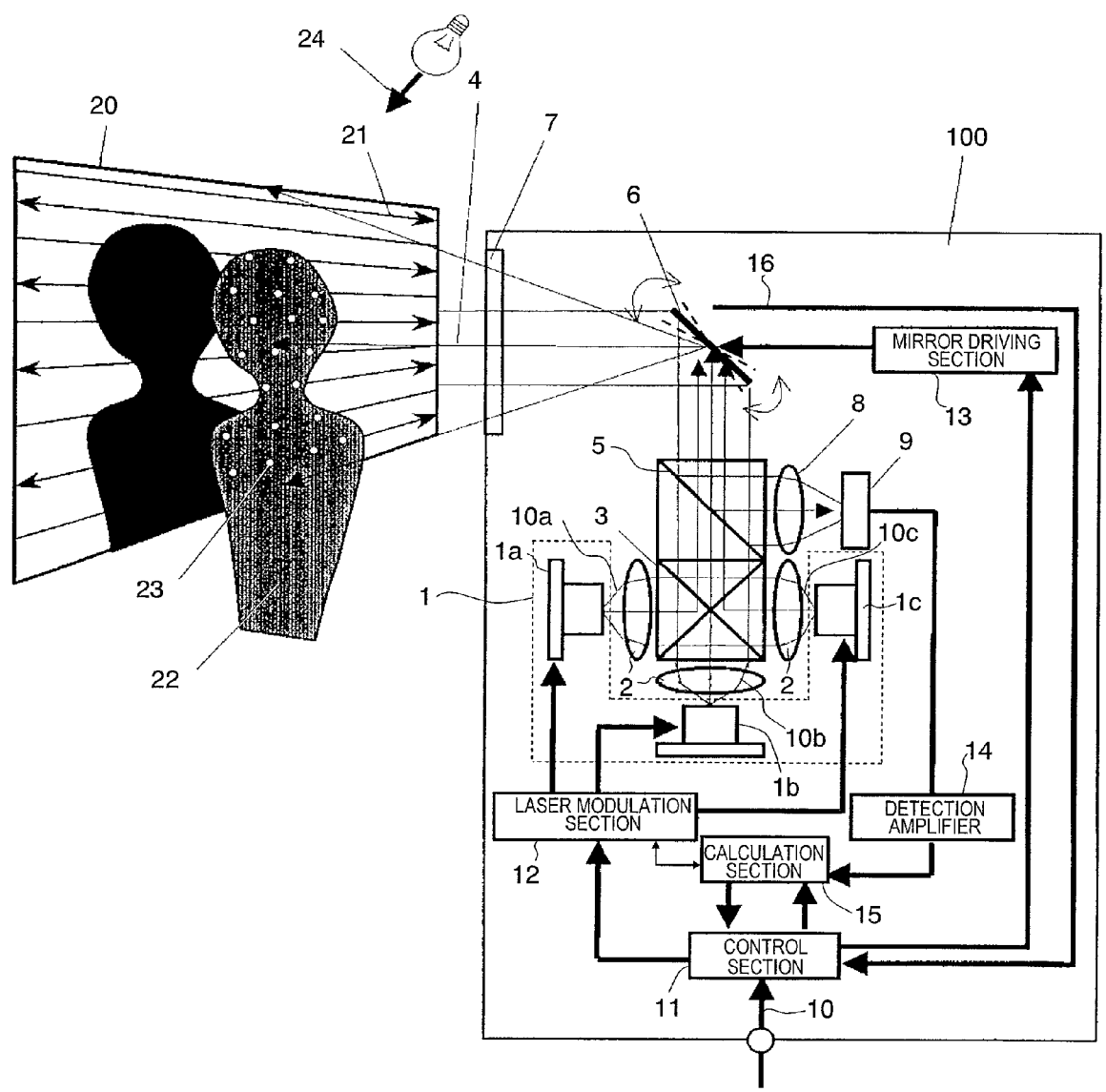
FIG. 1 A diagram showing an image projection apparatus according to Embodiment 1 of the present invention.

| | |
|---|---|
| 1 | light source |
| 2 | collimating lens |
| 3 | dichroic prism |
| 4 | projection laser light |
| 5 | half mirror |
| 6 | mirror section |
| 7 | aperture |
| 8 | converging lens |
| 9 | photodetector |
| 10 | image signal |
| 11 | control section |
| 12 | laser modulation section |
| 13 | mirror driving section |
| 14 | detection amplifier |
| 15 | calculation section |
| 16 | angular displacement signal |
| 20 | screen |
| 21 | laser beam spot locus |
| 22 | obstacle |
| 23 | random dots |
| 24 | ambient light |

Best Mode For Carrying Out The Invention

Hereinafter, embodiments of the present invention will be described with reference to the drawings. Like constituent elements will be denoted by reference numerals, and repetition of similar descriptions will be avoided.

(Embodiment 1)

With reference to FIG. 1 to FIG. 6, a first embodiment of an image projection apparatus according to the present invention will be described. First, FIG. 1 will be referred to. FIG. 1 is a diagram showing an image projection apparatus 100 according to the present embodiment. The video projection apparatus 100 displays an image on a screen or the like with at least a portion of projected laser light. In the video projection apparatus 100, laser light and a mirror section for image displaying purposes are also utilized for an operation of detecting an image displayable region. As a result, cost reduction is realized based on a reduced number of parts, and downsizing of the video projection apparatus 100 can also be realized.

The image projection apparatus 100 includes a light source 1 for outputting laser light 10a to 10c, collimating lenses 2, a dichroic prism 3, a half mirror 5, and a mirror section 6 for allowing the laser light 10a to 10c to be reflected and projected. The light source 1 outputs laser light of each color of n primary colors (where n is a natural number equal to or greater than 3). In this example, the light source 1 includes a light-emitting element 1a for outputting red laser light 10a, a light-emitting element 1b for outputting green laser light 10b, and a light-emitting element 1c for outputting blue laser light 10c. Note that the light source 1 may output multiprimary-color laser light of four primary colors or more.

The image projection apparatus 100 further includes a laser modulation section 12 for modulating the laser light 10a to 10c, a mirror driving section 13 for driving the mirror section 6, a photodetection section 9 for detecting the intensity of at least a portion of laser light returning from a projection direction of the laser light, a calculation section 15 for determining an image displayable region based on the detected intensity, and a control section for controlling these constituent elements.

Next, the operations of the image projection apparatus 100 will be described more specifically.

The laser light 10a to 10c which have been output from the light source 1 (three primary colors of RGB) are each narrowed by each collimating lens 2, and merged by the dichroic prism 3 to become a single ray of projection laser light 4. The laser light 4 goes through the half mirror 5 and enters the mirror section (scan mirror) 6. The mirror section 6 is a laser light scanning means to realize a two-dimensional scanning with the laser light 4 for displaying an image. The mirror section 6 may be a bi-axial pivoting mirror element, for example, but two mono-axial mirror elements may also be used, or a rotating polygon mirror element may be used. The laser light 4 having been reflected by the mirror section 6 goes through an aperture 7 so as to be projected onto a screen 20.

The projected laser light 4 is reflected by the screen 20 or the like, and its reflected light again enters the mirror section 6. The mirror section 6 reflects at least a portion of the laser light 4 that returns from the projection direction of the laser light 4, so as to be led into the photodetection section 9. The reflected laser light 4 is split by the half mirror 5, goes through the converging lens 8, and is detected at the photodetection section 9.

The optics for photodetection purposes are set for measuring the reflected light intensity of a spot region of the projected laser light 4.

The photodetection section 9 is a photodiode, for example, and is particularly preferably an amorphous silicon photodiode. An amorphous silicon photodiode is a visible-light sensor which can be used without filters because of its wavelength sensitivity characteristics being close to the human visibility as compared to those of single-crystalline silicon diodes, and is characterized by an excellent response based on its PIN structure, as well as its inexpensive substrate material and low production costs.

An image signal 10 of an image to be displayed is externally input to the control section 11. In accordance with the image signal, the laser modulation section 12 generates a modulation signal with which to modulate the laser light. The light source 1 outputs laser light which is modulated in accordance with the modulation signal. In synchronization with the modulation of the laser light by the laser modulation section 12, the mirror driving section 13 drives the mirror section 6.

An angular displacement signal 16 which is output from the mirror section 6 is returned to the control section 11, whereby the mirror section 6 is feedback controlled.

The laser light 4 which is used for scanning by the mirror section 6 forms a laser beam spot locus 21 on the screen 20. Examples of scanning approaches for the laser light will be described with reference to FIG. 2.

Figure 2:
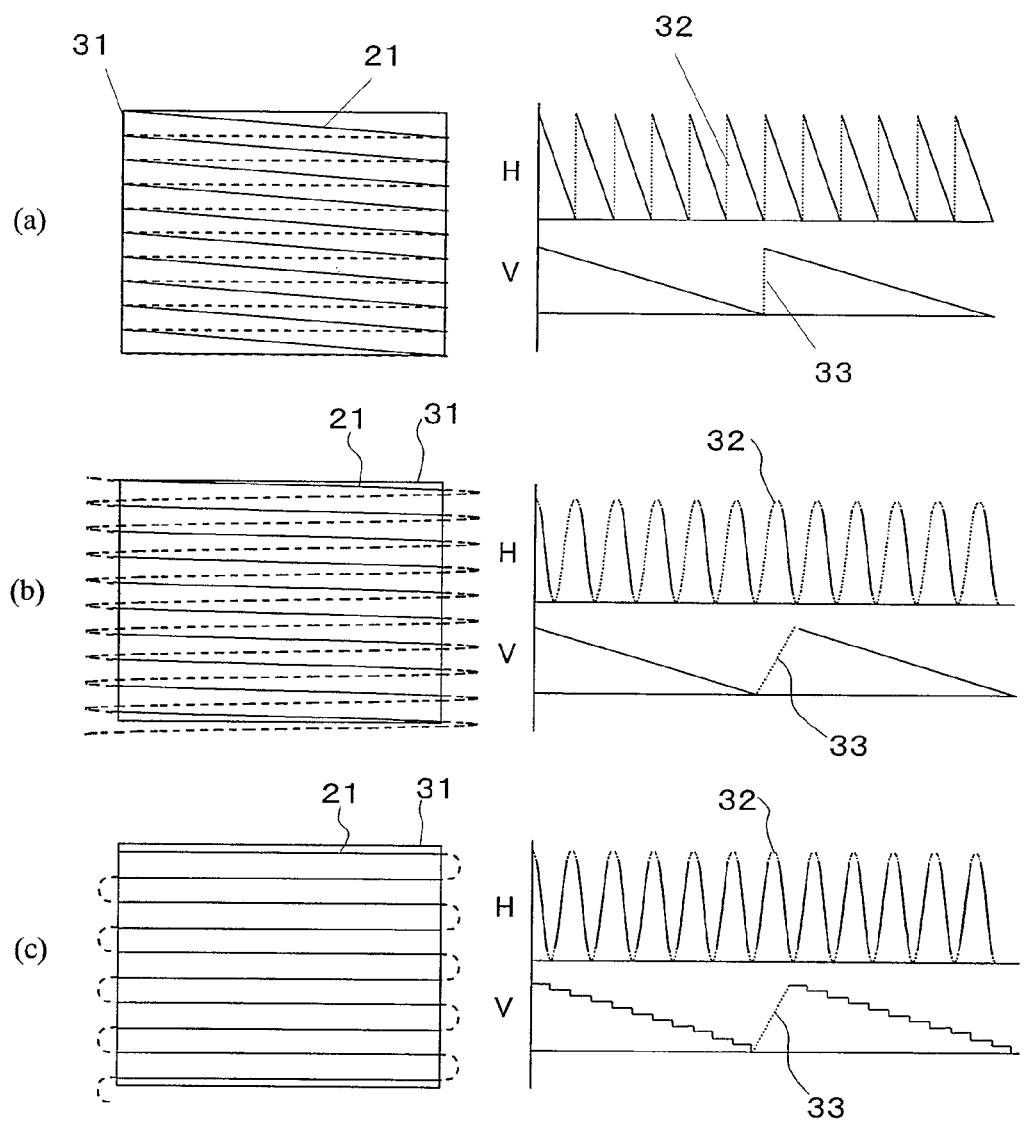
FIG. 2 Diagrams showing scanning approaches according to Embodiment 1 of the present invention.

FIG. 2 shows laser beam spot loci 21 by scanning approaches, and driving signal waveforms along a horizontal direction (H) and a vertical direction (V).

FIG. 2(a) illustrates a linear raster scanning approach, where linear driving signal waveforms are exhibited along both the horizontal direction and vertical direction. This scanning approach is adopted in the case of using a polygon mirror element. Since the driving frequency is high along the horizontal direction, it is usually difficult to linearly drive a pivoting mirror at a rapid rate. The periods of returning from the right end to the left end, and from the bottom to the top, of the screen are blanking periods in which only the mirror returns without activating laser light. A horizontal blanking period 32 and a vertical blanking period 33 are shown by dotted lines.

FIG. 2(b) illustrates a resonant raster scanning approach, where laser light is used for scanning along the horizontal direction, based on a resonation operation of a pivoting mirror. In resonance driving, a large amplitude is obtained with a relatively small force as compared to the case of linearly driving a pivoting mirror. Since the frequency along the vertical direction is low, it would be possible to linearly drive a galvano mirror.

Moreover, since the mirror operation is sinusoidal in resonance driving, and one-way scanning occurs along the horizontal direction, the horizontal blanking period becomes longer, and the lighting time of laser light is halved.

FIG. 2(c) illustrates a resonant raster scanning approach, where reciprocal scanning takes place along the horizontal direction.

Reciprocal scanning facilitates driving because the driving frequency may be half. As compared to the method shown in FIG. 2(b), the lighting time of laser light is twice as long, thus resulting in a good efficiency. Strictly speaking, however, the scanning lines are not parallel. Therefore, it is necessary to correct the vertical driving signal waveform so as to become stepwise, thus ensuring that the scanning lines are parallel.

With reference to FIG. 1, the photodetection section 9 generates a reflected light intensity signal which is in accordance with the received laser light. The reflected light intensity signal is amplified by a detection amplifier 14 and sent to the calculation section 15. The calculation section 15 compares an intensity indicated by the reflected light intensity signal against the modulation signal generated by the laser modulation section 12 to determine an image displayable region. Note that the calculation section 15 may determine an image displayable region by comparing an intensity indicated by the reflected light intensity signal against the image signal. The laser modulation section 12 generates a modulation signal for ensuring that an image which is in accordance with the image signal is displayed in an image displayable region. Moreover, for any region other than the image displayable region, the laser modulation section 12 generates a modulation signal for projecting laser light for detection purposes, with which to detect obstacles. The details of the process of determining an image displayable region and the laser light for detection purposes will be described later.

In the image projection apparatus 100, an obstacle detection operation is realized by only adding the half mirror 5, the converging lens 8, and the photodetection section 9 to the construction of a scanning-based laser projector, and no separate radiants for detection purposes are provided. Moreover, the photodetection section 9, which is a single sensor rather than a two-dimensional sensor array such as a CCD, is capable of two-dimensional detection of a projection region by the use of a scan mirror which performs two-dimensional scanning. Such a construction realizes a very small-sized and inexpensive image projection apparatus.

Next, operations of the image projection apparatus 100 which are in accordance with safety standards for laser light will be described. The maximum radiation power of laser light is set to a radiation power such that an energy that enters an eye of a human when the laser light scans the eye is equal to or less than a safe level which is defined by a safety standard(s).

First, a radiation power which is defined by a safety standard(s) for laser light will be described, followed by descriptions of a concept to be applied in the case of emitting stronger laser light as well as the radiation power which is enabled by that concept and brightness of the projector.

As safety standards for laser light, there is "IEC60825-1 standard", and in Japan there is "JIS C6802 radiation safety standards for laser products" (hereinafter abbreviated as the JIS), where classification of laser products and measurement methods are defined.

Therein, accessible emission limits (hereinafter referred to as AELs) of class 1, which are regarded as basically safe, are defined in Table 1 (not shown) of the JIS, with respect to different wavelengths and exposure times. As for products which emit visible light, class 2 AELs are defined in Table 2 (not shown) of the JIS.

The above takes into consideration the fact that avoiding actions such as blinking would occur to protect the eyes against any laser light which is visible light, and, by assuming that the reaction time thereto is 0.25 seconds, stipulates 1 mW in the case where the emission duration is equal to or greater than 0.25 seconds and the same AELs as those in class 1 for 0.25 seconds or less. In other words, in the case of continuous-wave laser light, e.g., a laser pointer, the radiation output power is limited to 1 mW.

On the other hand, for scanning-type laser products, a method for determining the AEL is defined in section (f) repetitive pulse laser and modulation laser under 8.4 classification rule of the JIS.

The above stipulates that the most stringent among the following three conditions must be applied in making the determination.

1) Exposure from any single pulse within a pulse train must not exceed the AEL for a single pulse (AELsingle).
2) An average power of a pulse train lasting an emission duration T must not exceed each of the powers corresponding to the AELs defined in Tables 1 to 4 (not shown) with respect to a single pulse lasting an emission duration T.
3) An average pulse energy of pulses within a pulse train must not exceed a value (AELtrain) obtained by multiplying the AEL for a single pulse by a correction factor C5.

AELtrain=AELsingle×C5

$$C5 = N\wedge{-0.25} \quad \text{(eq. 1),}$$

where N is a number of times the pupil is scanned in 0.25 seconds.

In the case of performing a two-dimensional scanning as in a scanning-based projector, N increases as the pupil is scanned by laser light, so that condition 3) usually becomes the most stringent. A measurement method is defined in 9.3 measurement optics of the JIS.

Figure 3:
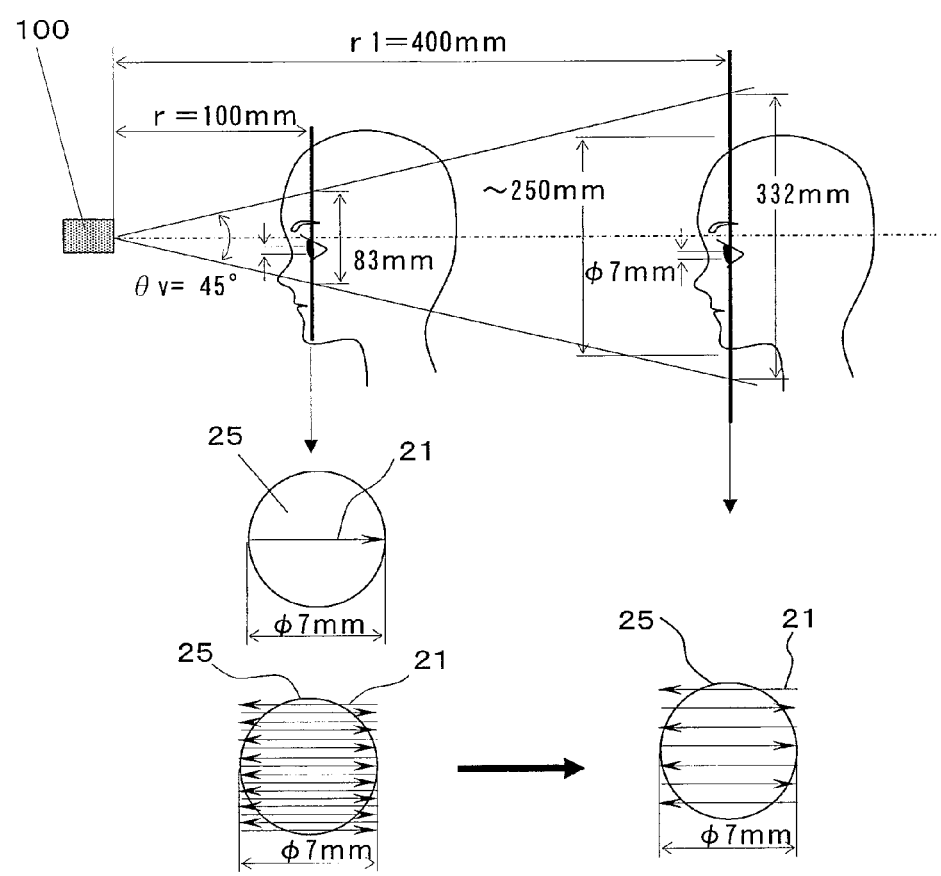
FIG. 3 A diagram showing a distance between a pupil and a projector, as well as a projection region, according to Embodiment 1 of the present invention.

Hereinafter, with reference to FIG. 3, a calculation method for radiation power will be described. FIG. 3 is a side view showing a distance between a pupil and a projector, as well as a projection region.

Measurement conditions for the radiation power of scanning-type laser light are defined so that a measurement aperture 25 has a diameter of φ7 mm and a measurement distance r is 100 mm. The φ7 mm of the measurement aperture 25 is in accordance with the maximum value of the diameter of the human pupil. The radiation power as calculated under the defined measurement conditions will vary depending on the scanning conditions. Hereinafter, calculation examples under the following scanning conditions will be described. In each parameter, suffixes h and v represent horizontal and vertical, respectively.

Scanning Conditions:
display resolution XGA(Nh=1024, Nv=768 pixels)
frame rate fv=60 Hz
angle of view θh=60°, θv=45°
overscan rate (angle of view/total scanning angle) Kosh=Kosv=0.7
reciprocal scanning along the horizontal direction Kub=2 (corresponding to the scanning approach of FIG. 2(c))

The horizontal scanning frequency fh is expressed as follows.

$$fh = fv \times Nv/Kosv/Kub = 32.9 \text{ kHz} \quad \text{(eq. 2)}$$

The time t over which a pupil with D=φ7 mm that is located at a distance r=100 mm as shown in FIG. 3 is traversed by laser light is expressed as follows.

$$\begin{aligned} t &= \text{viewing angle/horizontal scanning} \quad \text{(eq. 3)} \\ &\quad \text{angular velocity of the measurement aperture} \\ &= (D/r)/(2 \times fh \times \theta h/Kosh) \\ &= 7.1E{-}7 \text{ (sec)} \end{aligned}$$

The number of times N that the pupil is scanned in 0.25 seconds is expressed as follows.

$$\begin{aligned} N &= (D/r)/(\theta v/Nv) * fv * 0.25 \\ &= 1020 \text{ (times)} \end{aligned}$$

From Table 1 of the JIS, the AELsingle for t=7.1E−7(sec) (AEL for a single pulse) is AELsingle=2.0E−7(J). From (eq. 1), an average pulse energy AELtrain within a pulse train (AEL for repetitive pulses) is:

$$\begin{aligned} AELtrain &= AELsingle \times N \wedge {-0.25} \quad \text{(eq. 4)} \\ &= 2.0E{-}7 \times 1020 \wedge {-0.25} \\ &= 3.54E{-}8 \text{ (J)}. \end{aligned}$$

(which corresponds to the state of the lower left measurement aperture 25 among the three measurement apertures 25 shown in FIG. 3)

The radiation power Ptrain is:

$$Ptrain = AELtrain/t \quad \text{(eq. 5)}$$
$$= 3.54E{-}8/7.1E{-}7 * 1000$$
$$= 49.9 \ (mW).$$

Accordingly, if the peak radiation power of the projector is reduced to 50 mW or less, then: the radiant energy amount which enters the pupil when as near as 100 mm is at a safe level; at a distance of 100 mm or more, the laser light is dispersed and thus is even safer; at a distance of 100 mm or less, the laser light scanning the pupil is not focused on a single point on the retina, and thus is safe. In other words, a safe level is obtained under all conditions.

Now, from the AEL for a single pulse according to the aforementioned condition 1), the radiation power is derived to be:

$$Psingle = AELsingle/t \quad \text{(eq. 6)}$$
$$= 2.0E{-}7/7.1E{-}7$$
$$= 281.7 \ (mW),$$

which is about 5.6 times as large a power.

This corresponds to the case where the number of times that the pupil is traversed by laser light is limited to one time (which corresponds to the state of the upper left measurement aperture 25 among the three measurement apertures shown in FIG. 3)

Therefore, by performing the appropriate processing described below, it becomes possible to increase the radiation power to about 280 mW at the most.

Similarly, P(mW) is as follows with respect to the number of times N.

TABLE 1

| N | N^-0.25 | P (mW) |
|---|---|---|
| 1 | 1.00 | 281.7 |
| 2 | 0.84 | 236.9 |
| 3 | 0.76 | 214.0 |
| 4 | 0.71 | 199.2 |
| 5 | 0.67 | 188.4 |
| 6 | 0.64 | 180.0 |
| 7 | 0.61 | 173.2 |
| 8 | 0.59 | 167.5 |
| 9 | 0.58 | 162.6 |
| 10 | 0.56 | 158.4 |
| 11 | 0.55 | 154.7 |
| 12 | 0.54 | 151.3 |

Thus, a number of scans may be selected so as to correspond to the peak power which is required for the projector. For example, in the case where the peak power P=150 mW, the number of scans may be limited to 12 times.

When the peak radiation power is 50 mW, the projector has a brightness of about 10 lumen. In order to ensure a brightness that is visible in a room at 400 lux (which is the brightness of a common office), e.g., 500 lux, the projection size would be about 8 inches. Assuming a projection size of 19 inches, the brightness of the screen would be about 89 lux, which is not visible in a bright room.

On the other hand, when the peak radiation power is the maximum 280 mW, the projector has a brightness of 56 lumen, thus resulting in about 500 lumen with 19 inches. In other words, as described above, by performing control so that the number of times that the pupil is traversed by laser light is limited, a sufficiently bright screen can be obtained even when projected into a greater size, while ensuring safety.

When the measurement distance is made farther than 100 mm, both t and N become smaller, thus resulting in a greater calculated radiation power Ptrain. When t=1.78E−7 (s) and N=255 (times), at a measurement distance of about 400 mm, the Ptrain would be 281.7 mW (about 280 mW) (which corresponds to the state of the lower right measurement aperture 25 among the three measurement apertures 25 shown in FIG. 3).

In other words, even when the radiation power is increased to 280 mW, the energy entering the pupil would be at a safe level at 400 mm or farther away, which means that there is no problem if the aforementioned processing is performed at least in a range from 100 mm to 400 mm.

Next, the operation of the photodetection section 9 will be described more specifically.

As shown in FIG. 1, while an image is being projected onto the screen 20 having a uniform surface, a reflected light intensity which is in accordance with the displayed image is detected by the photodetection section 9. However, when an obstacle 22 such as a human is present in a projection region of laser light, the reflected light in that region is disturbed, and the correlation between the reflected light intensity and the image signal is lost, so that a predetermined level of signal is no longer obtained. By excluding any such region from the image displayable region to suspend image displaying therein, damage to the eyes is prevented even when a human is present in the projection region.

In the region where image displaying is suspended, too, detection of reflected light intensity is to be continued, and image displaying must be resumed once it is determined that obstacles are no longer present. However, when the surroundings are dark, sufficient reflected light is not obtained and it is impossible to monitor the region where displaying has been suspended. Although the image projection apparatus 100 does not include any light source for detection purposes other than the light source for image displaying purposes, a random dot pattern may be displayed as a display pattern for detection purposes in any region where displaying has been suspended, and its reflected light may be detected. The random dot pattern is a pattern resembling polka dots.

In such a region, there is no problem if a pattern for detection purposes is displayed without displaying an image because an obstacle(s) that shades the screen is present. Moreover, the laser light for detection purposes projected in a dot pattern forms an irradiation in short pulses, and thus will not be dangerous even when entering the eyes.

For example, under the aforementioned scanning conditions, a time tp for displaying 1 pixel is:

$$tp = Kosh/2fh/Nh \quad \text{(eq. 7)}$$
$$= 1.04E{-}8 \ (s),$$

which is much shorter than the time during which the pupil is traversed. Thus, it is safe if irradiation is performed with laser light of a maximum radiation power, and there is no problem if an irradiation is performed with a radiation power that exceeds the peak power during image displaying, if necessary. From the density which dots are presented and from the pupil diameter, the number of pulses to enter the pupil in 0.25 seconds may be inferred and controlled to be equal to or less than the safe level. By ensuring that the radiation power of the laser light for detection purposes which is projected in a dot pattern is equal to or greater than the radiation power of the laser light for image displaying purposes, it becomes possible to detect more light even with pulse emission.

Moreover, by varying the displayed position of the dot for each frame (i.e., random dots), it becomes possible to perform determinations in finer regions during the course of displaying several frames, even if there are intervals between pulse irradiations.

Furthermore, as the laser light for detection purposes with which to present a random dot pattern, the light source 1 may display a white dot by simultaneously emitting laser light of three primary colors (RGB), or independently output laser light of each color to display a dot in each color. By determining which color of laser light was radiated to result in the reflected light intensity, it becomes possible to distinguish different colors in the projection region even by using a single-color photodetection section 9.

Note that, unlike a stationary type, a portable-type projector may be used for projection onto various objects, which are not necessarily limited to a screen. Moreover, it may be used in bright surroundings, and sources of light may be present within the projection region, e.g., a fluorescent lamp or a window. Thus, the state of an object in the projection region needs to be determined from a reflected light intensity that is detected from irradiation onto an object which may be lit by any arbitrary ambient light.

A reflected light intensity which is detected from a given point is determined by a product of the intensity of light which lights that point and the reflectance of that point. Therefore, assuming that the laser light used for irradiation produces an intensity signal Si; the ambient light 24 (FIG. 1) has a light intensity Samb; and the irradiation point has a reflectance R, then a reflected light intensity signal Sd which is detected by the photodetection section 9 is expressed as:

$$Sd=R\times(Si+Samb) \quad \text{(eq. 8)}.$$

Therefore, with a mere comparison between the intensity signal Si and the reflected light intensity signal Sd, it may be possible that presence of an obstacle may not be accurately determined because of the influences of ambient light.

For example, a situation may be possible where, even though a dark-colored object is present in front of a white screen, only the neighborhood of the object is lit with external light, so that the reflected light from the object becomes equivalent to the reflected light from the screen.

Accordingly, R×Samb=Sb, i.e., the reflected light intensity from a projection point when laser light is not being radiated, may be measured as a background luminance distribution, and $$S=(Sd-Sb)/Si \quad \text{(eq. 9)}$$

may be ascertained. The intensity signal S is a signal corresponding to the reflectance distribution in the projection region, with which it is possible to recognize the state of an object in the projection region without the influence of the ambient light.

The background luminance distribution is measured during a blanking period of laser light scanning. In a blanking period, during which the light source 1 is not lit, the mirror section 6 is driven in a similar manner to scanning, and the intensity of the light entering the mirror section 6 is detected by the detection section 9, whereby a background luminance distribution can be obtained. In determining the image displayable region, the calculation section 15 also uses the background luminance distribution.

Basically, the background luminance distribution is measured during a vertical blanking period. From the overscan rate Kosv=0.7 along the vertical direction, the number of scanning lines during a blanking period is 768×3/7=329 lines, given the number of scanning lines during image displaying, i.e., 768.

As shown in FIG. 3, at a distance that necessitates a detection operation (height: about 250 mm), the size of the head of a human occupies a large portion in the projection region. Therefore, not such a high resolution is required for the background luminance detection, and it will be sufficient if at least the human head and the background can be separated and further the vicinity of the eyes can be distinguished. In FIG. 3, the ratio between the pupil of φ7 mm and the screen size 332 mm at a distance of 400 mm is 332:7≈47:1, and therefore the number of scanning lines during the aforementioned blanking period will be sufficient to enable distinction of the vicinity of the eyes.

The data of background luminance distribution measured during a blanking period is temporarily stored to a memory, and data from the corresponding position is retrieved for use when processing the image displaying. For distinction from a detection operation during image displaying, a detection during a blanking period will be referred to as a blank detection.

Note that the background luminance distribution may be measured during a horizontal blanking period. In the scanning approach shown in FIG. 2(*b*), since one-way scanning is performed along the horizontal direction, there is as much horizontal blanking period as there is displaying period for every scanning line, and this can be utilized for blank detection. In this case, the same number of blank detection scanning lines exist as there are image displaying scanning lines.

Next, with reference to FIG. 4, the processing procedure for a signal which is detected by the detection section 9 will be described more specifically.

Figure 4:
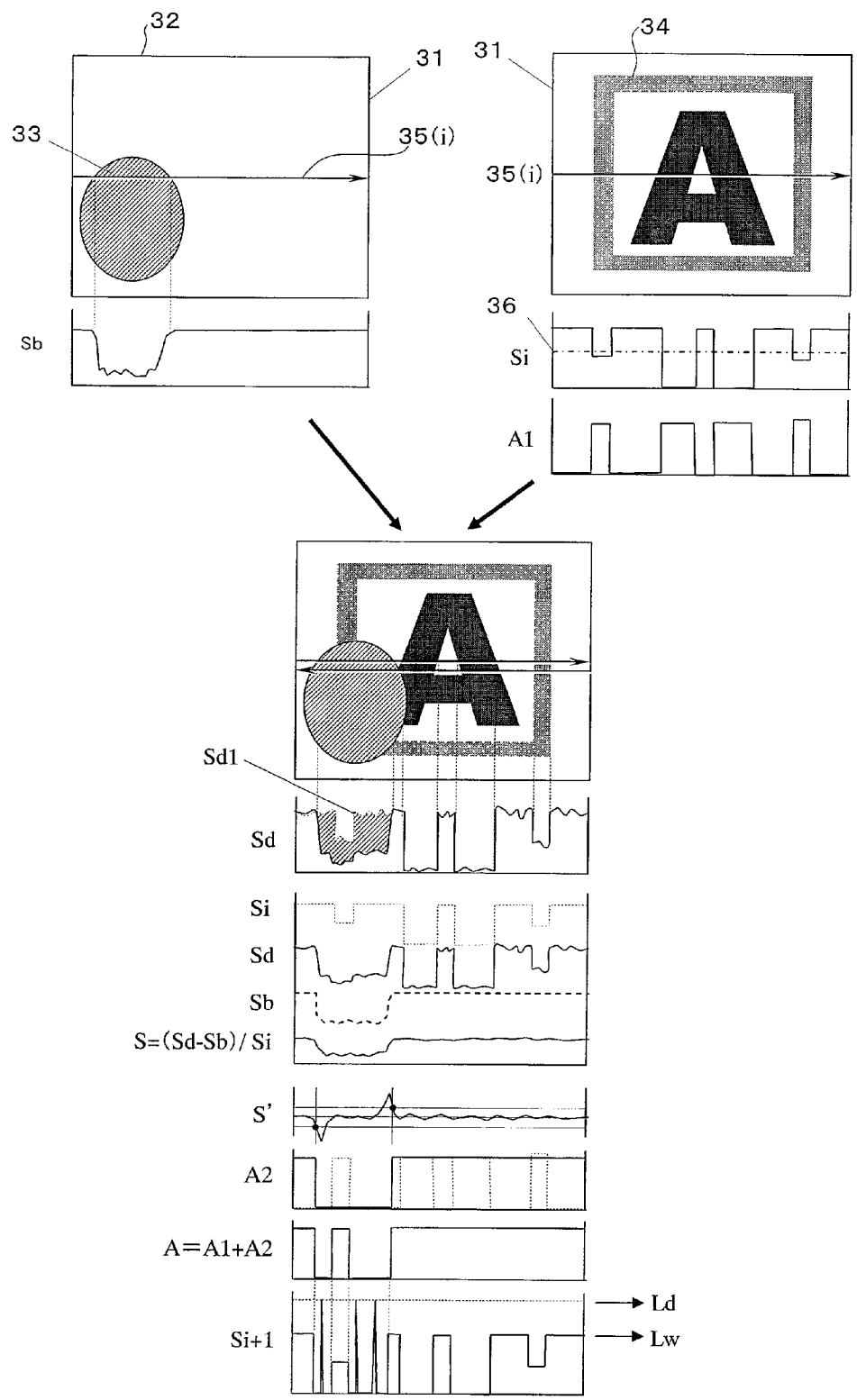
FIG. 4 A diagram showing a procedure of signal processing by the image projection apparatus according to Embodiment 1 of the present invention.

FIG. 4 is a diagram showing a procedure of signal processing executed by the calculation section 15.

With reference to FIG. 4, an obstacle 33 exists in front of a uniform screen, thus influencing a background luminance distribution 32 within a projection region 31. FIG. 4 shows an image luminance signal (laser modulation signal) Si on a scanning line 35(*i*) for displaying an image 34, a background luminance signal (blank detection signal) Sb at corresponding positions, and a reflection intensity signal Sd which is detected by the photodetection section 9 in this state.

A safe level 36 exists for the image luminance signal Si, and regions A1 represent regions which are at or below the safe level for the image luminance signal Si.

The safe level 36 is a radiation power as defined under the aforementioned JIS safety standards, and is 50 mW in the present embodiment. Any region where the radiation power is lower than this, where displaying is unconditionally permissible, is stored as the regions A1 to a memory.

In the regions of the uniform screen, a reflection intensity signal Sd is obtained which has an intensity distribution corresponding to the image luminance signal Si. However, in the region where the obstacle 33 exists, a reflection intensity signal Sd is obtained which has an intensity distribution not corresponding to the image luminance signal Si. Note that a signal waveform Sd1 represents a waveform in the absence of the obstacle 33. Herein, $$S=(Sd-Sb)/Si$$

is calculated, and further a differential signal S' of the signal S is sliced against a predetermined threshold value, thus extracting regions A2 where the signal S is at a constant level and is flat. The regions A2 are regions where the signal Si well corresponds to the signal Sd and thus can be said to be regions having a near-constant reflectance.

Therefore, a region A, defined as A=A1+A2, is determined to be an image displayable region. Then, when displaying the next scanning line 35(i+1), an image is displayed in the region A, but any other region is placed under the detection mode so that a random dot pattern is displayed, as indicated by an image luminance signal Si+1. Ld represents a peak level when displaying the random dot pattern, whereas Lw represents a peak level of laser light for displaying white.

Usually, a region which has been determined as containing an obstacle at a given scanning line is likely to contain the obstacle also at the timing of the next scanning line. Therefore, in this region, reflected light corresponding to the random dot pattern will not be detected, and thus this region will continue to be determined as an obstacle-containing region. When the obstacle disappears with lapse of time and reflected light which is equivalent to that in the displayable region is detected, image displaying is resumed in this now displayable region.

Thus, the calculation section 15 performs a process of determining an image displayable region with respect to each scanning line, and the laser modulation section 12 allows a result of the determination process to be reflected in the modulation of laser light corresponding to a subsequent scanning line. After continuously performing the determination process, when the obstacle is no longer detected in at least a part of the region other than the image displayable region, the calculation section 15 determines that image displaying in the region where the obstacle is no longer detected is possible. In this case, the laser modulation section 12 generates a modulation signal for displaying an image corresponding to the image signal in the region which has been newly determined as permitting image displaying.

Since a determination process is performed for each scanning line, calculations can be performed with minimum processing time, as compared to processing two-dimensional data for each single frame. If the delay time which is required for the above-described calculation process is within a horizontal blanking period, the result of determination for scanning line (i) can be immediately applied to scanning line (i+1). Therefore, even when a human is present in the projection region as an obstacle and the scanning line happens to meet an eye, the pupil will only be scanned once in the worst case, and at the next scanning line, the laser light for image displaying purposes will not scan the pupil any more. Usually, a pupil is not going to be present at the upper end of the contour of a head, so that the human will be detected before the scanning line reaches the pupil. Therefore, the laser light for image displaying purposes will not enter the pupil. Moreover, since the processing result is also reflected for the scanning line in the next frame, the laser light for image displaying purposes will not scan the pupil again. The possibility of the pupil being scanned once would pertain to the case where, at a moment of switching from a very dark image to a bright image, the laser light which has begun displaying goes over the pupil. In any other case, switching to the detection mode will have occurred before the scanning line reaches the pupil, and therefore the laser light for image displaying purposes will not enter the pupil.

In this case, the peak power of laser light for displaying white can be set to 280 mW.

If the delay time required for the calculation process is so long that it allows two or more scans of the pupil, a peak power as shown in Table 1 may be selected in accordance with the number of times.

Figure 5:
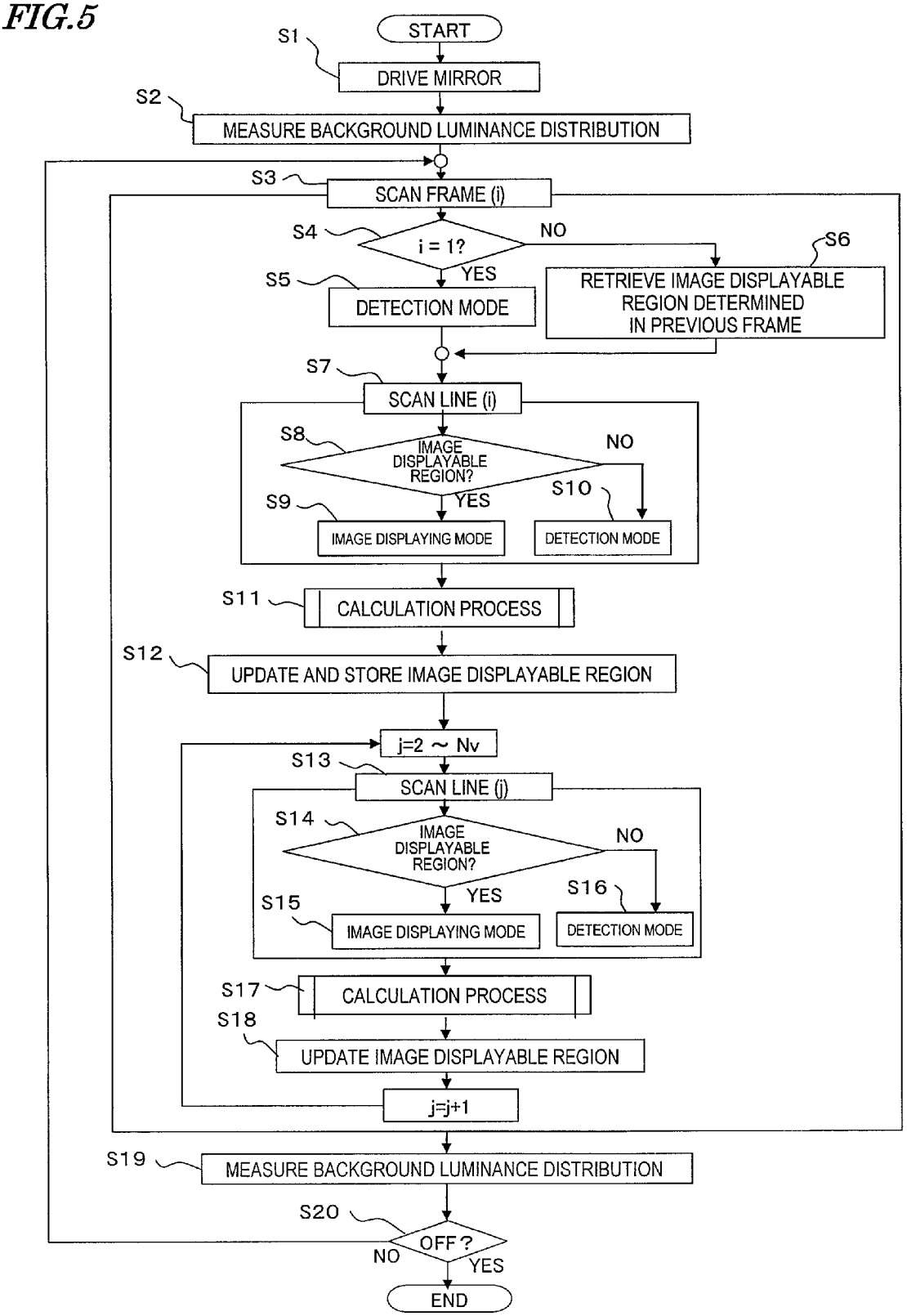
FIG. 5 A flowchart showing operations of the image projection apparatus according to Embodiment 1 of the present invention.

Next, with reference to FIG. 5, the above operations will be further described. FIG. 5 is a flowchart showing operations of the image projection apparatus 100.

Immediately after a boot of the image projection apparatus 100 and before the light source is lit, the mirror section 6 is driven first (S1), and a background luminance distribution in the projection region is measured and stored to a memory as two-dimensional data (S2). Thereafter, in an all-surface detection mode, before displaying an image, the light source 1 projects laser light for detection purposes in a random dot pattern, and begins frame scanning while detecting the reflected light intensity (S3). As a result of this, safety for the human eyes at the time of boot is ensured.

Line (1) of the first frame is scanned in the detection mode (S4 and S5). In the second frame or later, the image displayable region which was determined for the immediately previous frame is retrieved from the memory (S6). Based on the image displayable region which was determined when displaying the immediately previous image frame, the laser modulation section 12 modulates the laser light that corresponds to a scanning line at the uppermost end of the image frame. In accordance with the settings at S5 and S6, line (i) is scanned (S7 to S10), a calculation process is performed while detecting the reflected light intensity (S11), and the image displayable region is updated and stored (S12). At the next line and later (line 2 to Nv), an image is displayed in the image displayable region as determined at the previous line (S13 to S15), whereas any other region continues to be subjected to the detection mode (S16). At the same time, a calculation process (S17) is performed to update the displayable region (S18), and the next line is scanned.

When scanning for one frame has been finished, a background luminance distribution is detected in a vertical blanking period, and the data of background luminance distribution is updated (S19). Returning to frame scanning (S3), these operations are repeated until the image reproducing operation is turned OFF (S20).

Through these operations, images are consecutively displayed in the uniform portions of the screen which are free of obstacles.

Figure 6:
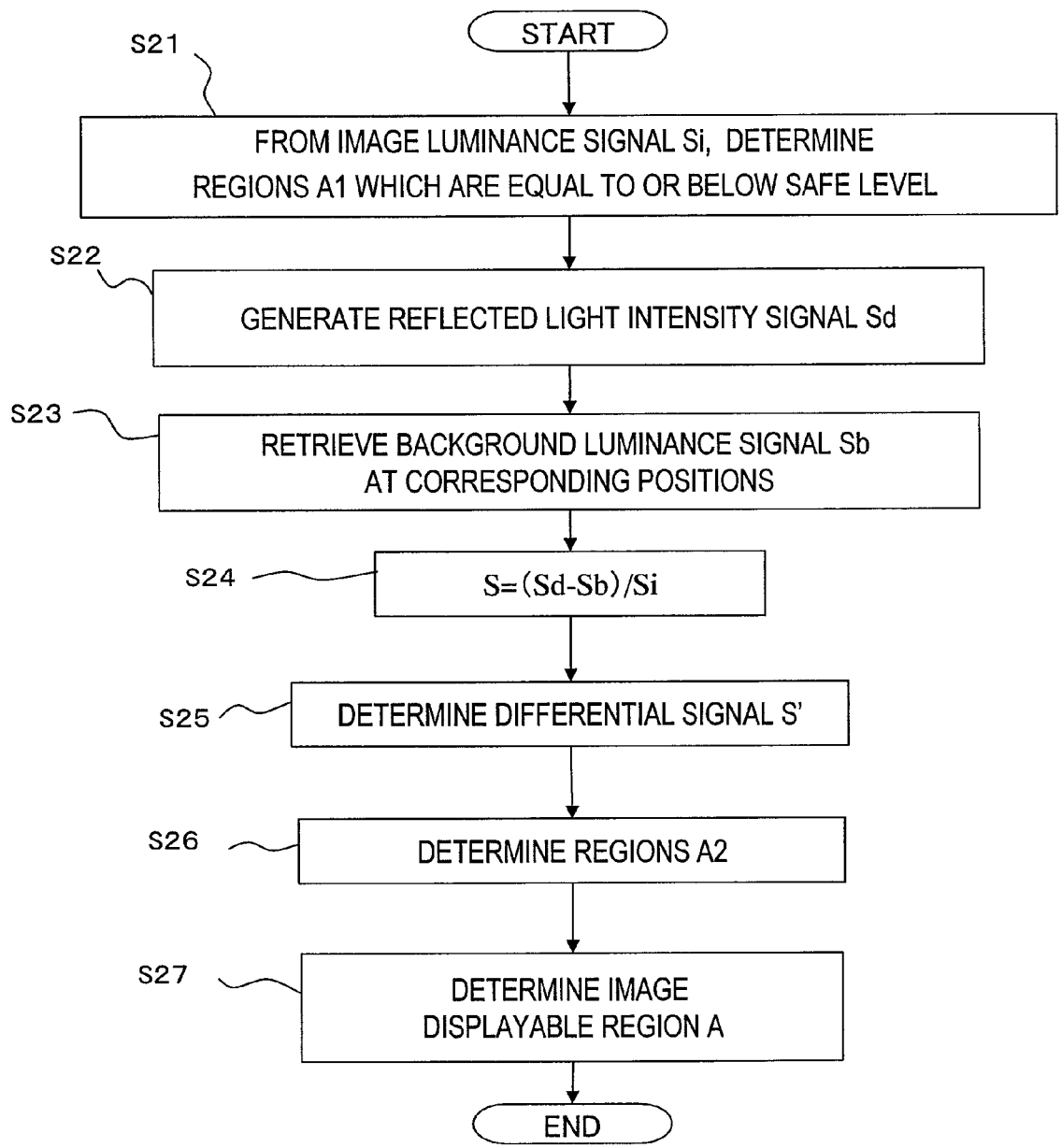
FIG. 6 A flowchart showing a calculation process by the image projection apparatus according to Embodiment 1 of the present invention.

With reference to FIG. 6, the calculation process (S11 and S17) will be described more specifically. FIG. 6 is a flowchart showing the details of the calculation process.

First, regions A1 which are equal to or below the safe level are determined from the image luminance signal Si (S21).

The photodetection section 9 generates a reflected light intensity signal Sd (S22), retrieves a background luminance signal Sb at corresponding positions from the memory (S23), and calculates S=(Sd−Sb)/Si (S24). Furthermore, a differential signal S' of the signal S is calculated (S25), and the differential signal S' is sliced against a predetermined threshold value to determine regions A2 (S26).

Next, A=A1+A2 is calculated to determine and update an image displayable region A (S27).

As described above, the image projection apparatus 100 detects an image displayable region by using laser light for displaying an image. By merely providing in the apparatus the detection section 9 for detecting reflected light intensity and the calculation section 15 in addition to the constituent elements for image displaying purposes, it is possible to perform detection of an image displayable region. Since it is not necessary to separately provide a sensor(s) for detection and a camera(s) for image monitoring in the apparatus as a mechanism for detecting objects and people, an image projection apparatus can be realized which is small-sized and inexpensive and yet enables bright image displaying in a safe manner. Moreover, safety for the human eyes is ensured by suspending image displaying only in the ranges of obstacles such as people. In any region which has been switched to the detection mode, detection of reflected light is continued by displaying a random dot pattern, and thus it is possible to automatically return to the usual image displaying mode once the obstacles have disappeared.

Furthermore, the process of determining an image displayable region is performed for every scanning line, and its result is reflected on the next scanning line. Therefore, switching between modes is possible with minimum processing time, and the safe level can be enhanced.

Moreover, when the calculation section 15 performs a process of determining an image displayable region, a luminance signal which is detected by the detection section 9 in a blanking period, during which the light source 1 is not lit, is used. Thus, a precise determination process becomes possible under various conditions, e.g., brightness or darkness of the place of use and the state of an object in the projection region, and a further enhanced safety can be provided.

(Embodiment 2)

Figure 7:
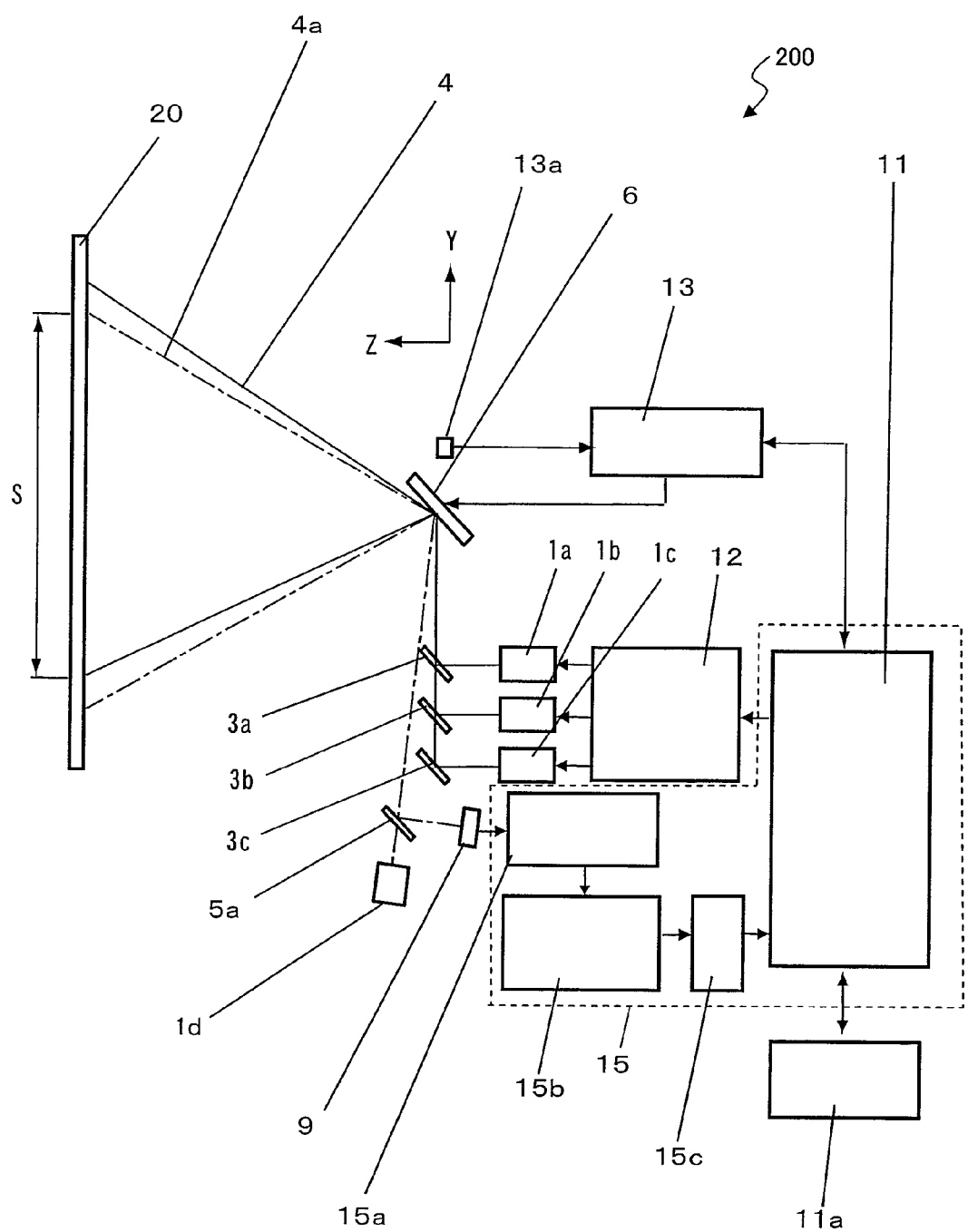
FIG. 7 A diagram showing an image projection apparatus according to Embodiment 2 of the present invention.

Next, with reference to FIG. 7 to FIG. 12, a second embodiment of an image projection apparatus according to the present invention will be described. FIG. 7 is a diagram showing an image projection apparatus 200 according to the present embodiment.

The image projection apparatus 200 measures the distance between a screen 20 and the image projection apparatus 200, and detects an obstacle (e.g., a human) from the measurement value. For example, the distance and tilt between the screen 20 and the image projection apparatus 200 are previously measured, and the measurement results are stored. Concurrently with the image displaying, distance measurement is continued, and by making a comparison between the stored distance and the newly measured distance, intrusion of an obstacle can be detected. Note that the distance between a projection target such as the screen 20 and the image projection apparatus 200 refers to the distance between the projection target and an arbitrary position in the image projection apparatus 200, e.g., the distance between the mirror section 6 of the image projection apparatus 200 and the projection target.

Moreover, in the case where the image projection apparatus 200 is a hand-held type or the like, the position and posture of the image projection apparatus 200 itself may frequently change. Even in such a case, the image projection apparatus 200 automatically re-detects a screen region. Since the user himself or herself does not need to confirm absence of obstacles between the screen 20 and the image projection apparatus 200 and again set a screen region, the user's convenience can be enhanced.

With reference to FIG. 7, the image projection apparatus 200 differs from the image projection apparatus 100 (FIG. 1) slightly with respect to the positioning of constituent elements. The image projection apparatus 200 includes as a constituent element of the light source a light-emitting element id for outputting infrared laser light 4a, and reflecting portions 3a to 3c and a half mirror 5a as optical elements.

Laser light having been output from light-emitting elements 1a, 1b, and 1c goes through reflecting portions 3a, 3b, and 3c, so as to be scanned by a mirror section 6 (beam scanning means) in a two-dimensional manner and projected onto a screen 20 as laser light 4 for image displaying purposes. Against a predetermined projection direction (Z direction) as a reference, the two-dimensional scanning by the mirror section 6 is to be performed within a range of ±22.5° in the Y direction (a direction which is perpendicular to the Z direction) and ±30° in the X direction (FIG. 8), for example. An angle sensor 13a is provided in the mirror section 6 to independently detect angles of bi-axial pivoting, and is controlled by a mirror driving section 13 to a predetermined projection angle. Note that the screen 20 may not necessarily be disposed completely perpendicular to the Z direction, but may have a predetermined tilt depending on the state of disposition of the image projection apparatus 200. As the mirror section 6, a bi-axial pivoting mirror element having independent pivot axes along the X direction and the Y direction is used, for example. However, two mono-axial mirror elements may be used, or rotating polygon mirror elements may be used.

The calculation section 15 includes a distance calculation section 15a, a profile storing section 15b, an LPF (low-pass filter) 15c, and a system controller 11. An image signal is input to the system controller 11, and in synchronization with a laser modulation section 12 modulating the laser light 4 for image displaying purposes, the mirror driving section 13 drives the mirror section 6, whereby an image is displayed.

In addition to the laser light 4 for image displaying purposes, infrared laser light 4a is radiated from the light-emitting element id. Since the infrared laser light 4a is non-visible light, its projection does not cause deteriorations in image displaying quality. The infrared laser light 4a goes through the half mirror 5a, and is reflected by the mirror section 6 so as to projected onto the screen 20. A portion of the infrared laser light 4a having been reflected from the screen 20 is reflected at the mirror section 6 and the half mirror 5a so as to enter the detection section 9. Since the infrared laser light 4a is pulse modulated, a distance between a point at which the infrared laser light 4a was reflected and the video projection apparatus 200 is calculated by counting the phase difference between the outgoing light from the light-emitting element Id and the light entering the detection section 9. The phase difference counting and the distance calculation are performed by the distance calculation section 15a. By recording the distances which are consecutively calculated by the scanning of the infrared laser light 4a, an outer-shape profile of places where the infrared laser light 4a was reflected can be acquired.

Besides the distance calculation section 15a, the calculation section 15 also includes a profile storing section 15b and a LPF (low-pass filter) 15c. The profile storing section 15b calculates a profile of the projection target from the calculated distance. The profile is recorded in the profile storing section 15b together with a projection direction of the infrared laser light 4a, which is identifiable from the angle of bi-axial pivoting as measured by the angle sensor 13a. Note that the infrared laser light 4a has its optical axis shifted from that of the laser light 4 for image displaying purposes and thus is projected into a slightly different range over the screen 20; however, image displaying and profile acquisition take place in the same region (a region S shown in FIG. 7). The image displaying and distance measurement are performed only during X+ direction scans in the scanning, and are never performed in the X− direction. For this reason, the infrared laser light 4a always scans ahead of the beam 4 for image displaying purposes. Within the scannable region of the beam 4 for image displaying purposes, in any region other than the region S, the radiation of the beam 4 for image displaying purposes is always on halt.

Based on distance, the system controller 11 detects a substantially planar region in the projection target, and determines that substantially planar region to be an image displayable region.

Based on the recorded profile, the system controller 11 calculates a curvature of the profile for each projected position. The system controller 11 also functions as a part of the calculation section executing each calculation process. In the profile, any portion that is acquired on the screen 20 has a near-zero curvature because the screen 20 is generally planar, whereas any portion that is acquired from an object that can be approximated to a sphere, e.g., a human head, has a certain degree of curvature. Thus, against a predetermined threshold value as a reference, the generally planar screen can be automatically distinguished from the others. Moreover, from the profile, the LPF (low-pass filter) 19 removes any rises and falls that are smaller than predetermined sizes of rises and falls. Although very large curvatures would be detected from extremely small rises and falls, the influences of the small rises and falls are eliminated by applying the profile to the LPF 19, whereby the determination accuracy is enhanced.

The laser stop position storing section 11a is a memory for recording, with respect to each projected position, a flag indicating whether to turn ON or OFF the light source 1 for displaying an image. The system controller 11 determines whether or not the calculated curvature falls within a predetermined range (e.g. a range near a curvature close to that of the human head). If it is within the range, a flag indicating that image displaying at that point should be turned OFF is written to the laser stop position storing section 11a, and if it is outside the range, a flag indicating that displaying should be turned ON is written. At the same time, while referring to the flags recorded in the laser stop position storing section 11a, the system controller 11 controls the laser modulation section 12 to switch between ON and OFF of the light source 1. Thus, the light source 1 does not perform image displaying in any region where the curvature falls within the predetermined range.

Figure 8:
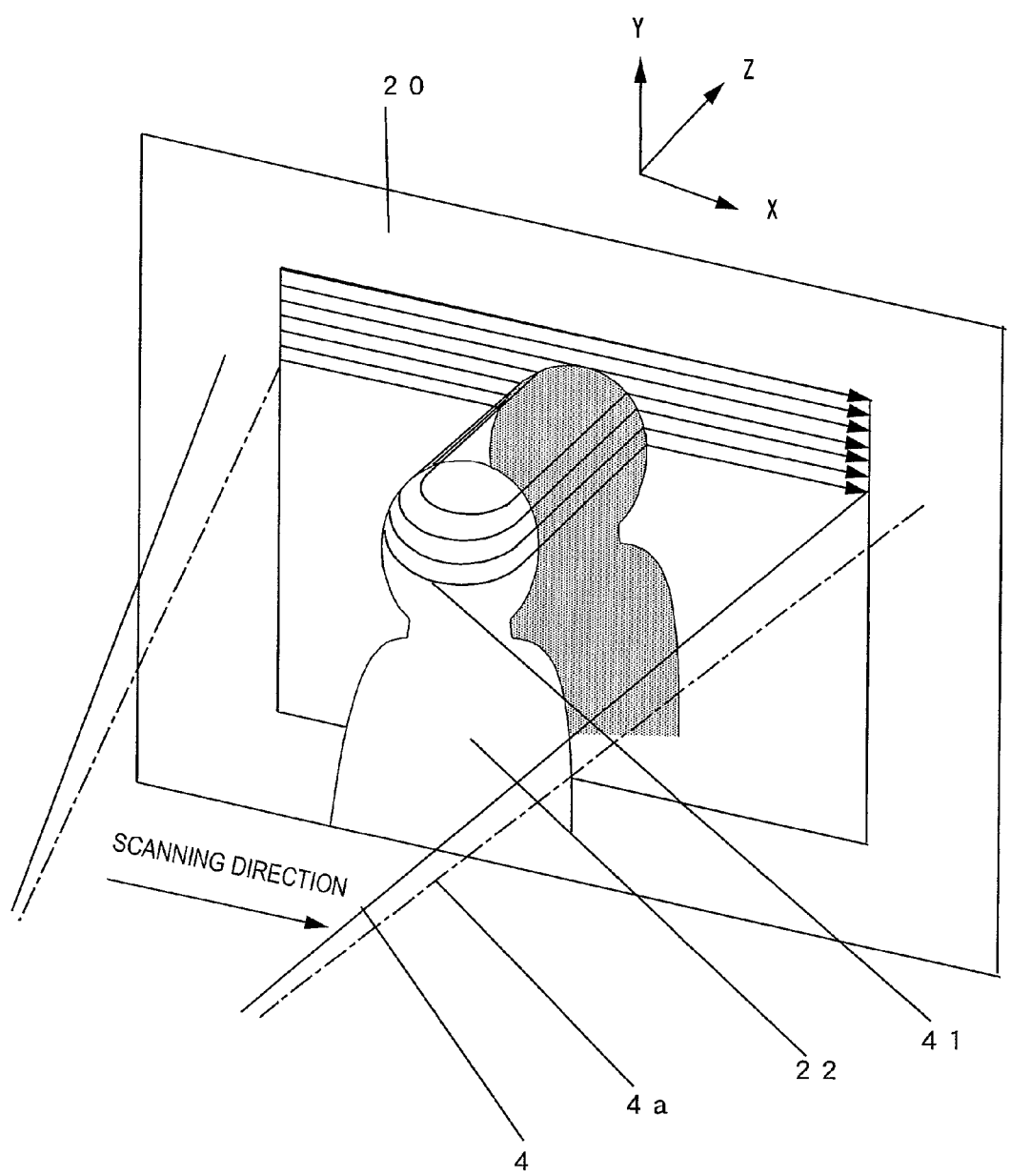
FIG. 8 A diagram showing an exemplary distance measurement process using infrared laser light according to Embodiment 2 of the present invention.

FIG. 8 is a perspective view showing an exemplary distance measurement operation using the infrared laser light 4a.

While the infrared laser light 4a for distance measurement purposes scans the screen 20 in the X+ direction to acquire a profile, the scanning position along the Y direction is sequentially changed from the Y+ direction to the Y− direction. If an obstacle 22 is present between the image projection apparatus 200 and the screen 20, the infrared laser light 4a is reflected at the obstacle 22 to thereby result in a shorter measured distance, whereby a discrete profile 41 is obtained.

Figure 9:
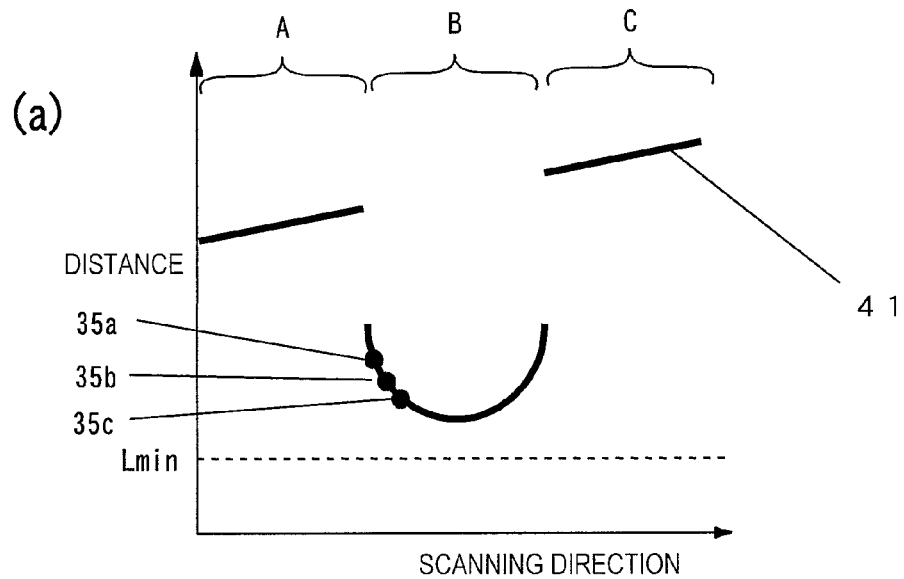
FIG. 9 Diagrams showing a planarity detection process according to Embodiment 2 of the present invention.
Figure 9:
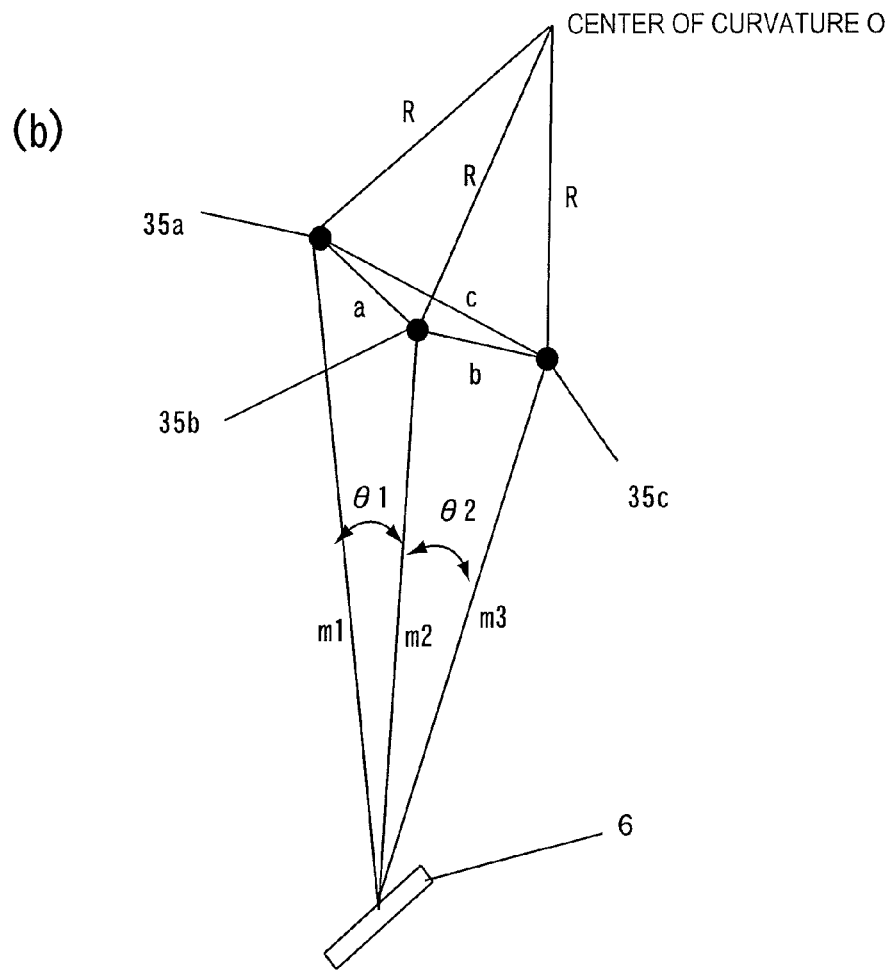

FIG. 9 illustrates an exemplary process of detecting the planarity of a projection target from the profile 41. FIG. 9(a) shows a profile to be subjected to planarity detection. FIG. 9(b) shows a planarity calculation method.

With reference to FIG. 9(a), a region A and a region C of the profile 41 are portions indicating distances which are measured when the infrared laser light 4a is reflected at the screen 20. These regions are generally straight lines and have a tilt, which indicates that the screen 20 is tilted with respect to a reference projection direction (Z direction) of the image projection apparatus 200. A region B of the profile 41 is a portion indicating distances which are measured when the infrared laser light 4a is reflected by the obstacle 22, the region B being a curve that fits along the outer shape of the obstacle 22. Note that, during the acquisition of the profile 41, if any distance is detected that is smaller than a predetermined value (Lmin), i.e., if the presence of an object is detected in a very close neighborhood of the image projection apparatus 200, radiation of the laser light 4 for image displaying purposes is immediately stopped even before a curvature is calculated. Specifically, the display flag for every position in the laser stop position storing section Ha is temporarily set to a flag indicating OFF.

Planarity detection within the scanned range is performed by calculating a curvature from the profile 41 and detecting places where the curvature is generally zero. For example, in the case where the obstacle 22 is a human head, the curvature of the profile 41 in the region B will be such that: the radius of curvature is 10 to 20 cm; and the curvature (which is an inverse of the radius of curvature) is about 0.05 to 0.1/cm. On the other hand, since the curvature of the profile of the screen region is generally zero, the planar portion in the scanned range (i.e., the screen 20) can be distinguished based on curvature. A method of calculating curvature from the distance measurement results at points 35a, 35b, and 35c on the profile 41 of the region B is described below.

With reference to FIG. 9(b), a distance m1 from the mirror section 6 to the point 35a, a distance m2 to the point 35b, and a distance m3 to the point 35c are assumed. The radius of curvature R, which is the distance from each point to the center of curvature O, and the curvature 1/R are expressed by (eq. 10), using a distance a between the point 35a and the point 35b, a distance b between the point 35b and the point 35c, and a distance c between the point 35a and the point 35c.

$$1/R = \sqrt{((a+b+c)(b+c-a)(c+a-b)(a+b-c))}/abc \quad \text{(eq. 10)}$$

Moreover, by using a scan angle θ1 between the point 35a and the point 35b and a scan angle θ2 between the point 35b and the point 35c, which are acquired from the angle sensor 13a, the distances a, b, and c can be calculated from (eq. 11) to (eq. 13).

$$a = \sqrt{(m1^2 + m2^2 - 2m1m2 \cos\theta1)} \quad \text{(eq. 11)}$$

$$b = \sqrt{(m2^2 + m3^2 - 2m2m3 \cos\theta2)} \quad \text{(eq. 12)}$$

$$c = \sqrt{(m1^2 + m3^2 - 2m1m3 \cos(\theta1+\theta2))} \quad \text{(eq. 13)}$$

Herein, the distances m1, m2, and m3 are extracted from the profile 41 having been passed through the LPF 15c, from which the influences of extremely small rises and falls and noises have been eliminated. Therefore, it is possible to accurately extract curvatures that are within the predetermined range. The number of points to be used for the curvature calculation is not limited to three points. The calculation may be performed by using a greater number of points and employing a least squares method. Instead of adjacent points, distant points may be extracted and subjected to calculation.

Figure 10:
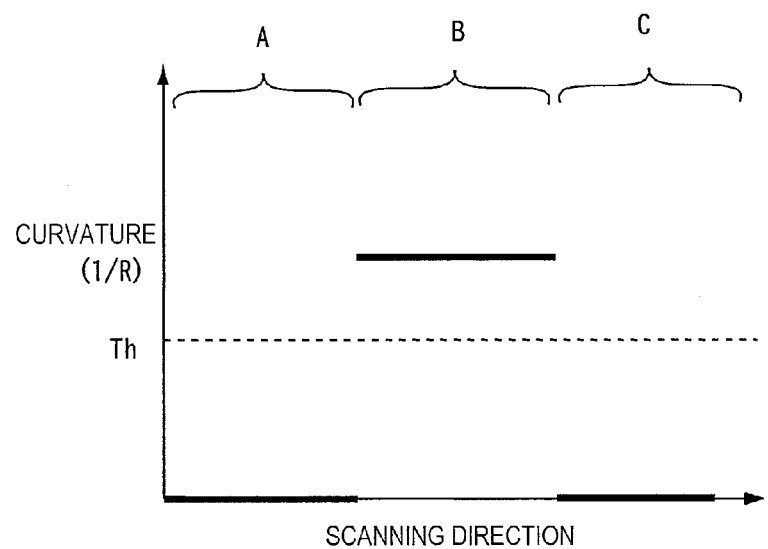
FIG. 10 A diagram showing an exemplary result of planarity calculation according to Embodiment 2 of the present invention.

FIG. 10 is a diagram showing an exemplary result of planarity calculation.

With reference to FIG. 10, curvatures which are in accordance with the outer shape of the obstacle 22 are shown in the region B, whereas the curvatures in the regions A and C are generally zero. By setting a predetermined threshold value Th (e.g., 0.02/cm), it becomes possible to distinguish the planar portion from any other portion from the distance measurement data alone.

Figure 11:
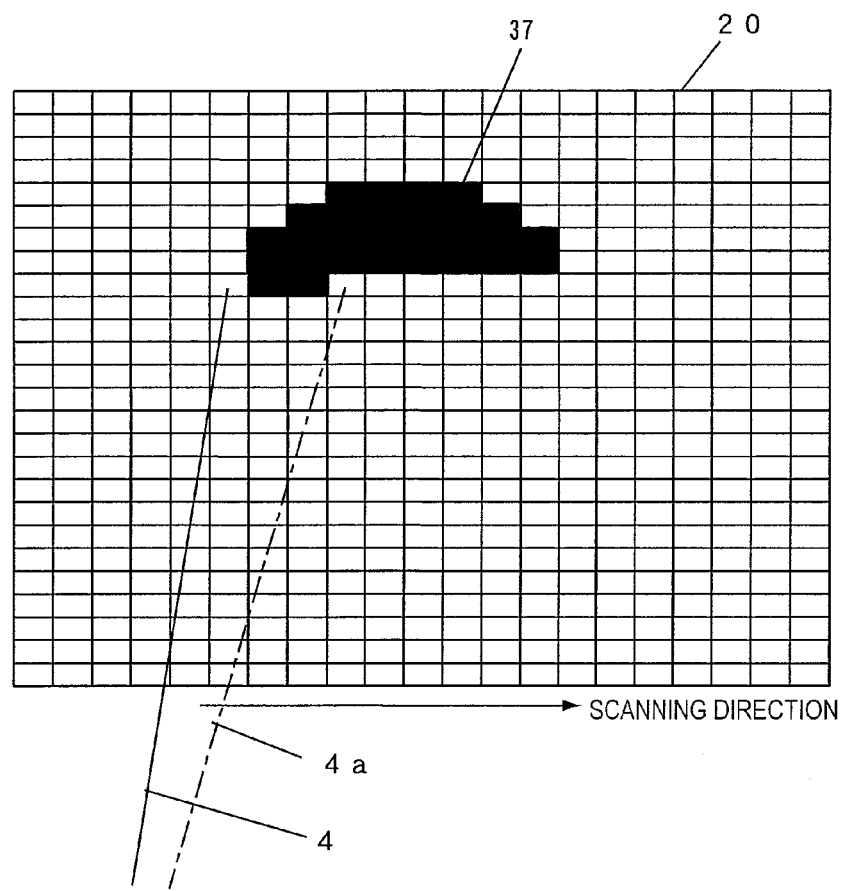
FIG. 11 A diagram showing a recorded content in a laser stop position storing section according to Embodiment 2 of the present invention.

FIG. 11 is a diagram showing recorded data in the laser stop position storing section 11a.

Every time a scan of the infrared laser light 4a and a calculation of curvature are performed, the system controller 11 writes a flag to a corresponding position in the laser stop position storing section 11a. FIG. 11 schematically illustrates contents of the flags, in a manner to correspond to positions on the screen 20 (although this is a simplified display where the number of displayed positions is reduced from the actual level). Any place where a display flag OFF point 37 is written is a place where the curvature is greater than the threshold value Th and therefore image displaying should be OFF, as shown in black. In the other, blank portions (image displayable region), a flag for turning ON the image displaying is written. The infrared laser light 4a is scanning ahead of the laser light 4 for image displaying purposes, so that the curvature calculation and evaluation can be performed before the laser light 4 for image displaying purposes performs display. When the laser light 4 for image displaying purposes scans the screen 20, the system controller 11 refers to the contents in the laser stop position storing section 11a, and turns ON the light source 1 only when the flag indicates ON, thus performing image displaying. As a result, the laser light 4 for image displaying purposes is turned OFF at any position other than the screen 20, whereby a highly-safe image projection system can be provided.

Figure 12:
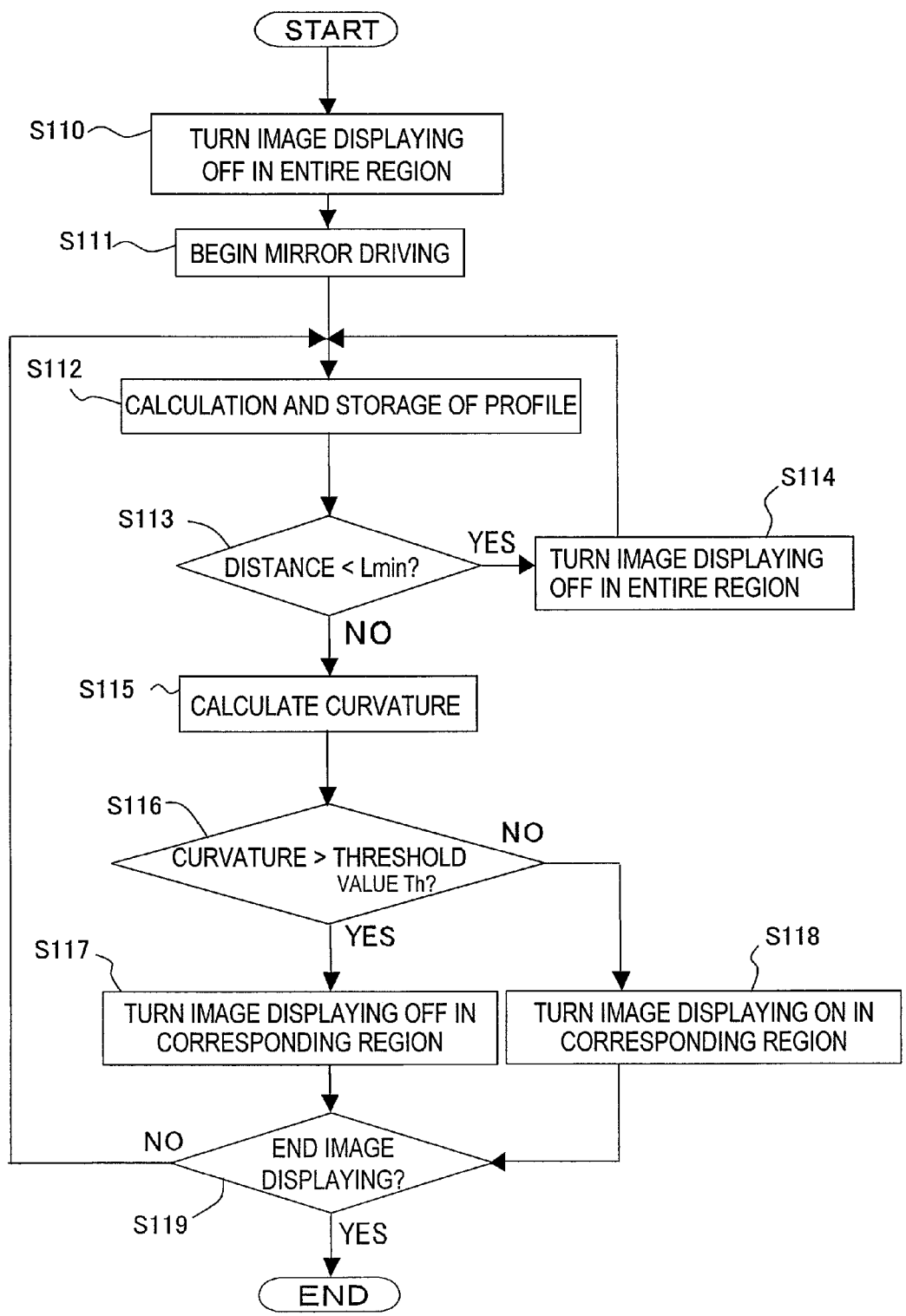
FIG. 12 A flowchart showing an operation of the image projection apparatus according to Embodiment 2 of the present invention.

FIG. 12 is a flowchart showing a planarity determination process.

When the image projection apparatus 200 is powered, all of the flags in the laser stop position storing section 11a are set to display-OFF (S110). Next, the mirror driving section 13 drives the mirror section 6 to begin scanning (S111). Independently from the following flow, the system controller 11 continues to control the laser light 4 for image displaying purposes.

Next, scanning with the infrared laser light 4a is performed to calculate a profile 41, which is then stored to the profile storing section 15b (S112). If any distance that is smaller than a predetermined distance Lmin is detected during the process of calculating the profile 41 (S113), it is determined that an object exists in a very close neighborhood of the image projection apparatus, and the display flags for all positions in the laser stop position storing section 11a are temporarily set to display-OFF to stop the laser light 4 for image displaying purposes irradiate (S114), thus ensuring safety.

Next, a curvature is calculated from the profile 41 (S115), and if it is greater than the threshold value Th (S116), a flag for the corresponding position in the laser stop position storing section 11a is set to display-OFF (S117). If it is smaller than the threshold value Th, a planar determination is made, and a flag for the corresponding position in the laser stop position storing section 11a is set to display-ON (S118). If there is no instruction for powering OFF (S119), control returns to the operation of step S112.

Instead of stopping radiation of the laser light 4 for image displaying purposes when a distance that is smaller than the predetermined distance Lmin is detected during the process of calculating the profile 41, a construction may be adopted where the output of the light source 1 is reduced to an output which is commensurate which the distance.

As described above, according to the present embodiment, planarity is calculated from the curvature of the profile 41, and laser light for image displaying purposes can be selectively projected only in a planar portion. This prevents projection onto obstacles, in particular human heads, thus providing a highly-safe image projection apparatus which is capable of preventing laser projection onto the eyeballs. Since detection of a planar portion is performed in real time and automatically based solely on the results of distance measurement, a highly convenient image projection apparatus which does not bother the user can be provided at a low cost and with a simple construction. Since the curvature calculation is performed after subjecting the profile 41 to the LPF 15c, influences of extremely small rises and falls and noises are eliminated, so that the curvatures that are within a predetermined range can be accurately extracted.

(Embodiment 3)

Figure 13:
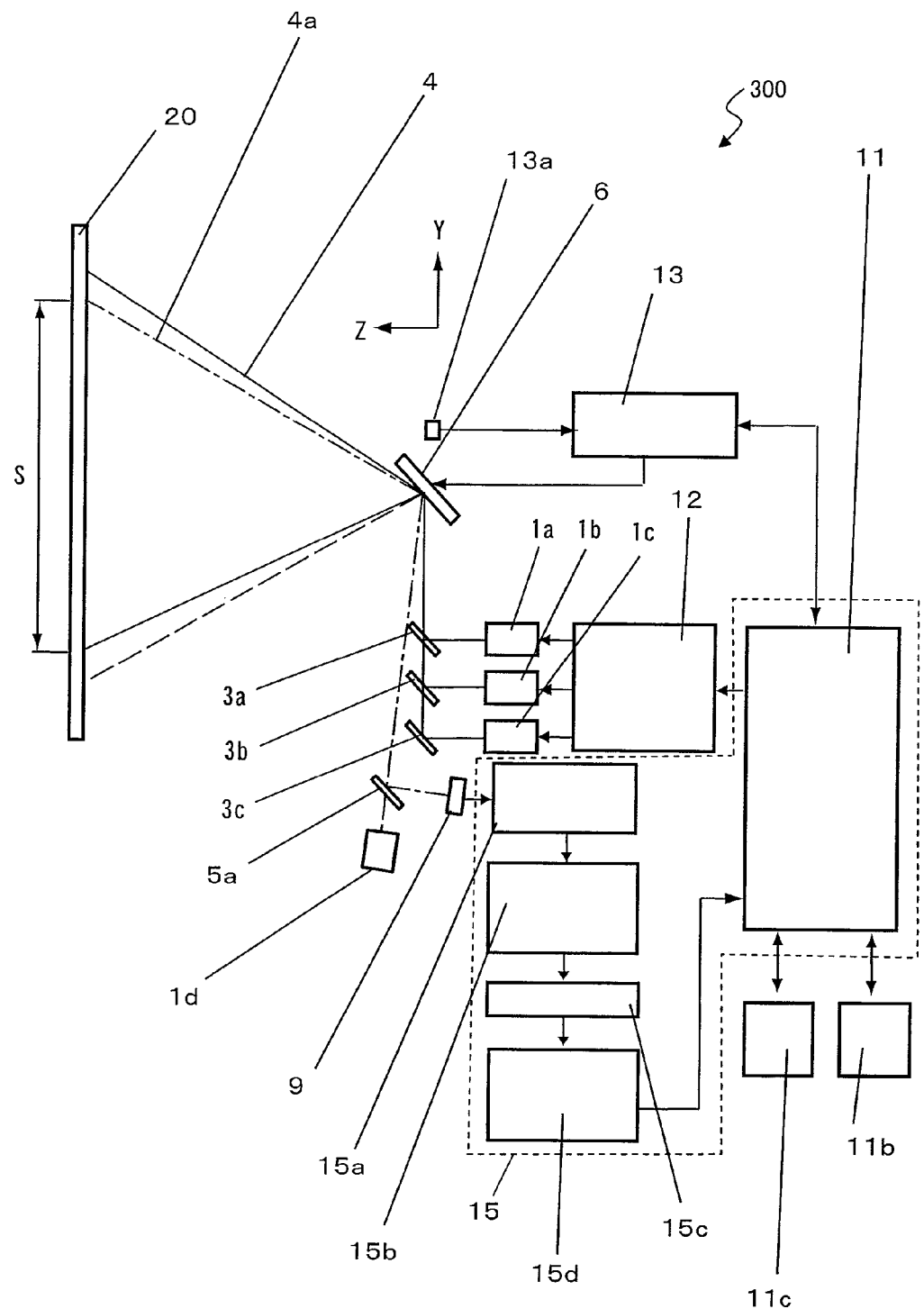
FIG. 13 A diagram showing an image projection apparatus according to Embodiment 3 of the present invention.
Figure 14:
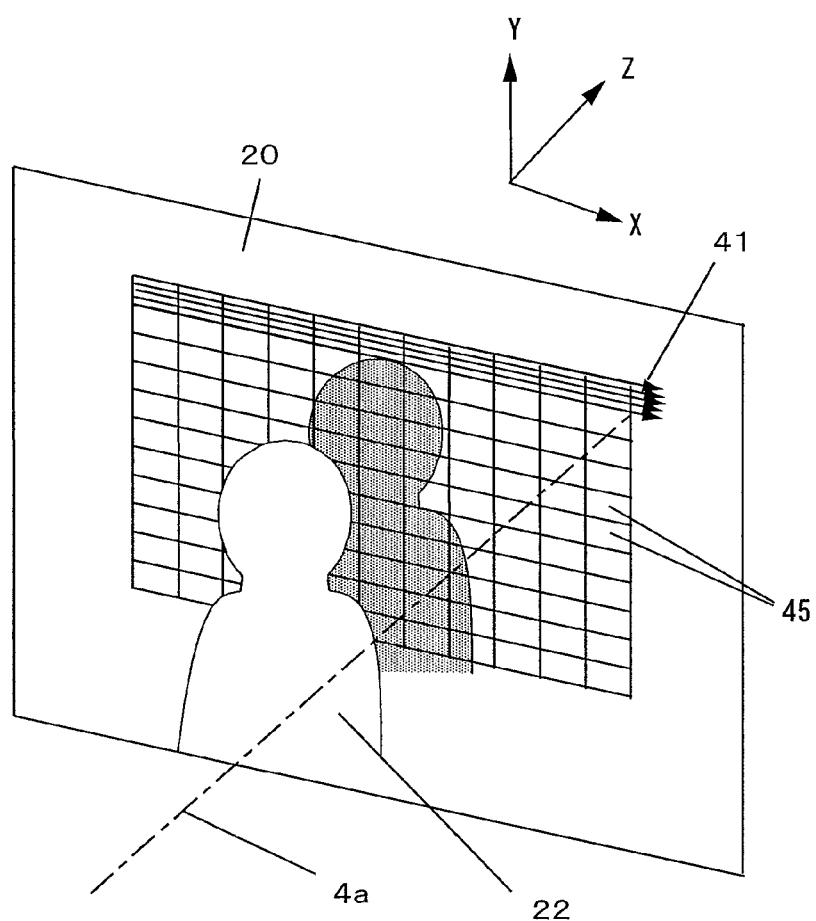
FIG. 14 A diagram describing subregions according to Embodiment 3 of the present invention.
Figure 15A:
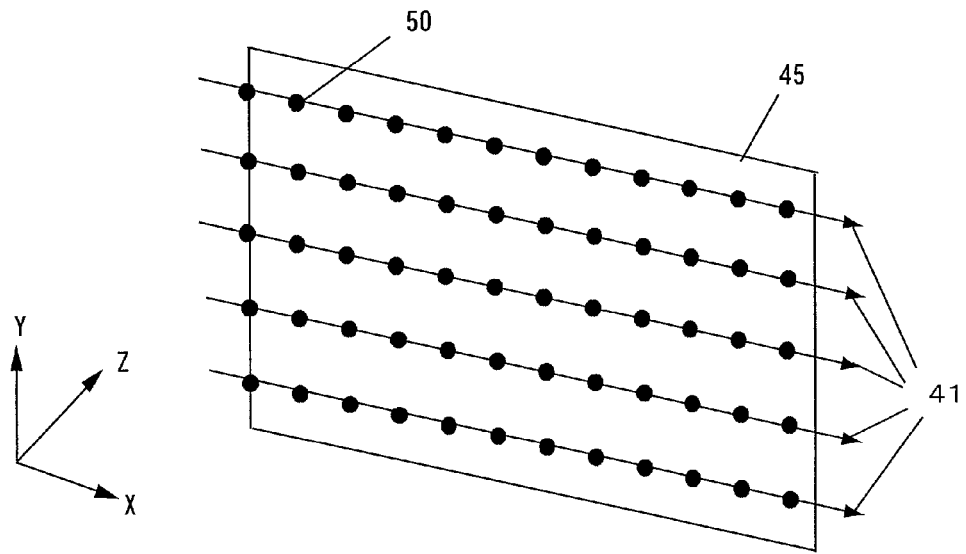
FIG. 15A A diagram describing a plane determination calculation according to Embodiment 3 of the present invention.
Figure 15B:
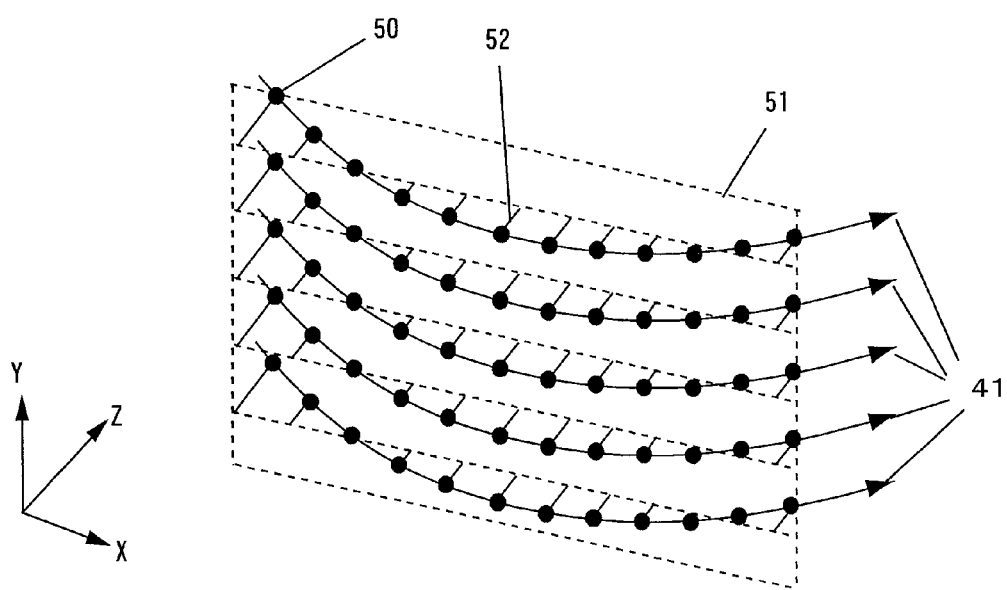
FIG. 15B A diagram describing a plane determination calculation according to Embodiment 3 of the present invention.

FIG. 13 is a diagram showing an image projection apparatus 300 according to Embodiment 3 of the present invention. FIG. 14 is a perspective view describing subregions (plane determination regions); FIG. 15A is a perspective view describing an exemplary plane determination calculation for subregions; and FIG. 15B is a perspective view describing another exemplary plane determination calculation for subregions.

In the image projection apparatus 300, before performing image displaying, a distance and a tilt between the image projection apparatus 300 and an image-projected region are automatically calculated, and a substantially planar region and its planar position are extracted. At the time of image displaying, an obstacle is detected by determining whether or not the measured distance coincides with the distance to the extracted plane. Moreover, the system controller 11 divides a plane corresponding to the projection target, as obtained based on distance, into a plurality of subregions 45 (FIG. 14), and determines whether each subregion 45 is substantially planar or not. Extraction of substantially planar regions in the image-projected region is performed by dividing the entire image-projected region into subregions 45 (which are small regions), and determining for each subregion 45 whether that place is substantially planar or not.

With reference to FIG. 13, a distance storing section 15d included in the calculation section 15 is a memory for recording a distance which is measured for every projected position. A profile 41 which is recorded in the profile storing section 15b is subjected to an LPF 15c to eliminate noise components therein, and then from the profile 41a distance at each projected position is extracted and recorded.

With reference to FIG. 14, each subregion 45 is a small region which is set by dividing the entire image-projected region. When distance measurement for all of the projected positions in the subregion 45 are completed, the system controller 11 determines whether the subregion 45 is substantially planar or not, and if it is determined as planar, records factors of a conditional equation expressing the plane to a plane information storing section 11b. Since plane determination is made by using all of the distance measurement data in the subregion 45, determination can be made with a higher accuracy. Since only in those subregions 45 which are determined as substantially planar does the system controller 11 perform image displaying with laser light 4 for image displaying purposes, it is possible to accurately prevent an image from being projected onto an obstacle 22 having a predetermined curvature, e.g., a human head, whereby a highly-safe image projection apparatus can be provided.

Moreover, among the subregions 45 that are substantially planar, it is expected that all those regions which are directly projected onto a screen 20 are substantially coplanar. Therefore, by extracting coplanar places from within the plurality of subregions, the position of the screen 20 can be identified. The positions of the subregions which are identified as being on the screen 20 are recorded to a screen region storing section 11c. Usually, there is a very low possibility that an obstacle having a substantially planar shape is a human head, and thus little safety problem would occur even if an image projection was performed for non-planar shapes only. However, by identifying the screen 20 and performing selective image projection, a further enhanced safety can be provided.

Next, the operations of the image projection apparatus 300 will be described more specifically.

First, a process of extracting substantially planar subregions 45, as a process prior to image displaying, will be described.

With reference to FIG. 14, scanning with infrared laser light 4a is performed along the X+ direction across the screen 20 to acquire profiles 41, while the scanning position along the Y direction is sequentially changed to the Y− direction. In the meantime, projection of the laser light 4 for image displaying purposes is OFF. The entire image-projected region is divided into a multitude of subregions 45. Note that the border lines are imaginary lines which are illustrated for convenience only. After having been acquired, each profile 41 is passed through the LPF 15c to have its noises eliminated, and is broken down to distances at the respective positions in the subregion 45 (a horizontal projection angle and a vertical projection angle acquired by an angle sensor 13a) so as to be stored to the distance storing section 15d. Once the distances at all positions in the subregion 45 have been acquired, the system controller 11 determines whether each subregion 45 is planar or not.

With reference to FIG. 15A, plane determination points 50 in the subregion 45 are points for which horizontal and vertical projection angles and measurement distances are recorded in the distance storing section 15d, and a plurality of them are distributed through the subregion 45, along the profile 41. Based on the horizontal and vertical projection angles and the measurement distance of each plane determination point 50, the system controller 11 calculates the X, Y, and Z coordinates of each plane determination point 50. Next, by using least squares method, from the X, Y, and Z coordinates of all of the plane determination points 50 in the from subregion 45, the system controller 11 calculates an imaginary plane whose mean square is the smallest (hereinafter referred to as the least-square plane). The least-square plane is calculated from the following calculation formulae. The least-square plane is expressed as in (eq. 14):

$$z = \alpha x + \beta y + \gamma,$$ (eq. 14)

and factors $\alpha$, $\beta$, and $\gamma$ are obtained by solving a determinant of (eq. 15):

$$\begin{vmatrix} \Sigma XX & \Sigma XY & \Sigma X \\ \Sigma XY & \Sigma YY & \Sigma Y \\ \Sigma X & \Sigma Y & \Sigma 1 \end{vmatrix} \begin{vmatrix} \alpha \\ \beta \\ \gamma \end{vmatrix} = \begin{vmatrix} \Sigma XZ \\ \Sigma YZ \\ \Sigma Z \end{vmatrix}$$ (eq. 15)

where, $\Sigma XX$, for example, represents a sum total of squares of the X coordinates of all plane determination points 50.

As shown in FIG. 15A, in the case where the subregion 45 is substantially planar and the plane determination points 50 are generally on the subregion 45, the calculated least-square plane generally coincides with the subregion 45. On the other hand, in the case shown in FIG. 15B, the least-square plane is as shown by a plane 51, i.e., calculated to be away from some of the plane determination points 50.

Next, with reference to the calculated least-square plane, a variance of the lengths of perpendiculars 52 from the plane determination points 50 is calculated. If this level of variance (variance value) is equal to or less than a predetermined value, it is determined that the respective plane determination points 50 are on the least-square plane, i.e., that the subregion 45 is substantially planar. In the case where the perpendiculars 52 have large lengths as shown in FIG. 15B, the variance value will be greater than the predetermined value, so that the subregion 45 can be determined as not being substantially planar. As a result, even if there remain errors of distance measurement, their influences are reduced, whereby a precise plane determination is made possible. Thus, in the case where the level of variance in the distance between the least-square plane (imaginary plane) and the projection target is equal to or less than the predetermined value, the system controller 11 determines that the subregion is substantially planar.

At this time, the conditional equation expressing a position and a tilt of the subregion 45 is as shown by (eq. 14), and so these plane factors $\alpha$, $\beta$, and $\gamma$ are recorded to the plane information storing section 11b as a result of the plane determination. In the plane information storing section 11b, a result of determination is individually recorded for each subregion 45. If the subregion 45 is determined as planar, a flag indicative of it being planar and factors $\alpha$, $\beta$, and $\gamma$ are recorded. If it is not determined as planar, only a flag indicative of non-planarity is recorded.

Next, a method for finding the position of the screen 20 will be described. When plane determination for all positions in the image-projected region has been completed, those subregions 45 which have been determined as planar are grouped so that every group contains those positioned substantially coplanar. For example, the determination as to whether two subregions 45 are substantially coplanar can be made by checking if the factors $\alpha$, $\beta$, and $\gamma$ which are recorded in the plane information storing section 11b are respectively equal within a predetermined range of errors. If there is only one group, i.e., all those subregions 45 which are determined to be planar are coplanar, all such subregions 45 are determined to be the screen 20, and a result of this is recorded to the screen region storing section 11c. What is recorded in the screen region storing section 11c is a flag indicating whether each subregion 45 is the screen 20 or not. If there are a plurality of groups, i.e., the projection region contains a plurality of planes with different positions or tilts, it is necessary to determine which plane is the screen 20. This may happen when an obstacle 22 intruding the projection region includes a planar portion, for example. The determination for the case of a plurality of groups is made by comparing the areas of the respective planes and detecting a plane that has the largest area. For example, in the case where the areas of the respective subregions 45 are prescribed to be all equal, the detection can be easily be made by selecting a group that has the largest number of subregions 45 belonging thereto. Among those subregions which have been determined as substantially planar, the system controller 11 classifies any subregion that is positioned coplanar into one group, thus dividing the subregions which have been determined as substantially planar into a plurality of groups. Then, an image is displayed in the subregions that belong to the group that has the broadest area. Since a plane that has the largest area is determined to be the screen, an image is projected in a planar portion that has the largest area within the projection region, whereby losses of the image can be minimized and thus a high-quality image projection apparatus can be provided. Since the screen 20 is identified so that an image is projected only onto the screen 20, there is provided a highly-safe image projection apparatus which can surely prevent projection onto a human head or the like.

Figure 16A:
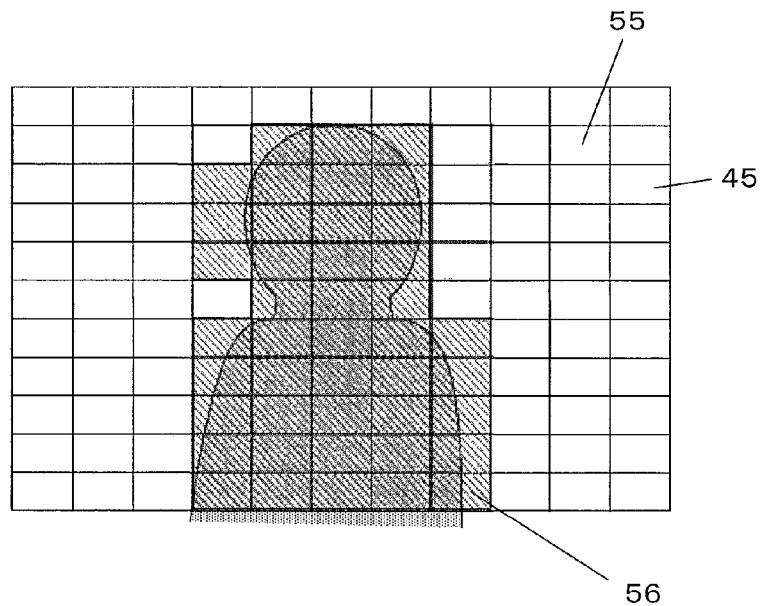
FIG. 16A A diagram showing a recorded content in a screen region storing section according to Embodiment 3 of the present invention.
Figure 16B:
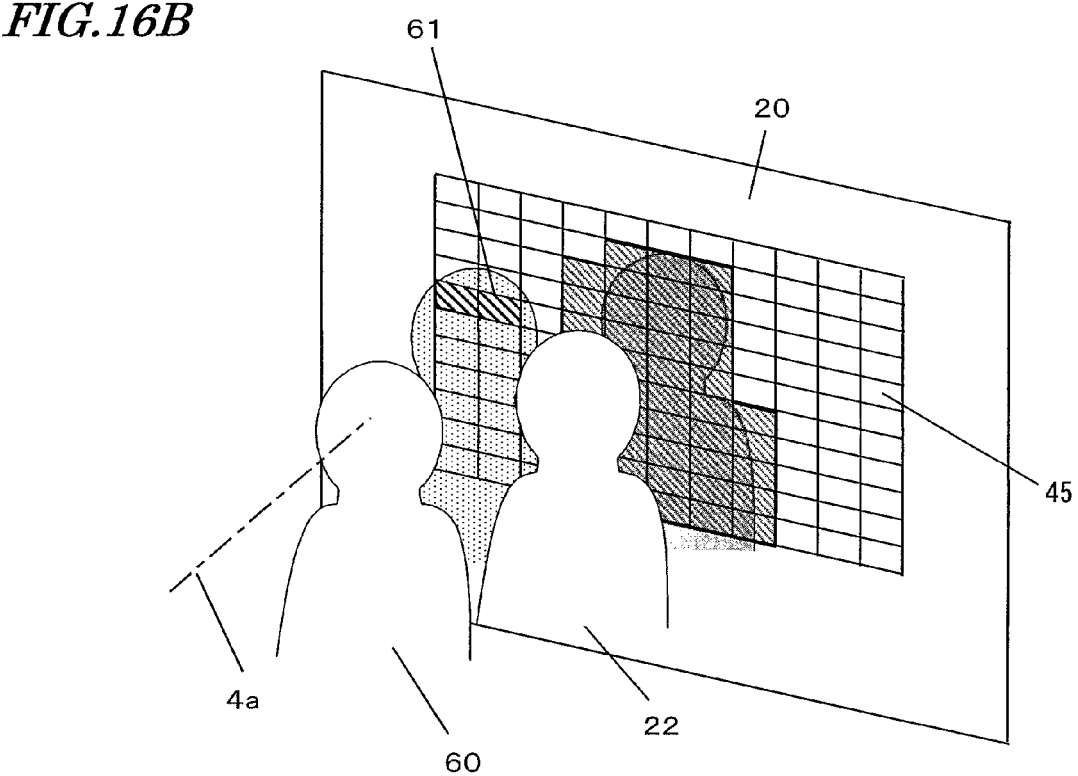
FIG. 16B A diagram showing a distance measurement operation during image projection according to Embodiment 3 of the present invention.

FIG. 16A is a diagram showing an example of information which is recorded in the screen region storing section 11c. FIG. 16B is a diagram showing a distance measurement operation during image projection.

With reference to FIG. 16A, a screen region 55 is a set of subregions 45 shown as blank. All the subregions 45 within the screen region 55 have been determined as planar, and are positioned coplanar. A non-screen region 56 is a set of subregions 45 shown hatched. The subregions 45 within the non-screen region 56 have been determined as non-planar, or may be those which have been determined as planar but belong to a group of planes with small areas. The contents of the screen region storing section 11c are referred to when performing image displaying, and used for stopping displaying in the non-screen region 52.

Although the method for identifying the position of the screen 20 illustrated above finds each group of what is positioned substantially coplanar and thus makes an identification, this is not a limitation.

For example, each group of adjoining subregions 45 which are not coplanar but are contiguous within a predetermined range of errors, such that the directions of the normal vectors of the respective planes coincide within a predetermined range, may be found. As a result, the position of the screen 20 can be identified even in the case where the entire screen 20 is slightly warped, for example.

Next, a process of performing image displaying will be described.

By referring to the screen region storing section 11c, the system controller 11 determines whether a subregion 45 to be scanned with laser light 2 is within the screen region 55 or within the non-screen region 56, and projects the laser light 2 only if it is within the screen region 55. As a result, an image can always be projected onto the screen 20 only.

On the other hand, the system controller 11 also takes distance measurements with infrared laser light 4a at the same time, and by referring to the screen region storing section 11c, determines whether a subregion 45 to be scanned by the infrared laser light 4a is within the screen region 55 or within the non-screen region 56.

If the subregion 45 scanned by the infrared laser light 4a is within the screen region 55, then a determination is made as to whether the infrared laser light 4a is being reflected at the screen 20 or not, based on the plane information which is recorded in the plane information storing section 11b. If it is not being reflected at the screen 20, it is determined that an obstacle has newly intruded. Thus, if the difference between the newly measured distance and the position information is equal to or greater than a predetermined value, the system controller 11 re-determines the subregion whose difference is equal to or greater than the predetermined value as a non-planar region. In this case, the light source suspends image displaying in the subregion whose difference is equal to or greater than the predetermined value.

With reference to FIG. 16B, when an obstacle 60 has newly intruded during image displaying, the infrared laser light 4a will be reflected at the obstacle 60, rather than at subregions 61 where it should have been reflected. Therefore, the measured distance will become shorter than in the case of being reflected at the subregions 61, whereby intrusion of the obstacle 60 can be detected. In this case, the system controller 11 immediately re-determines any such subregion 61 as a non-planar region, and rewrites the stored contents in the plane information storing section 11b and the screen region storing section 11c. The laser light 4 for image displaying purposes which scans the same region following the infrared laser light 4a is not projected in any such region, thus realizing an immediate prevention of image projection onto the newly-intruded obstacle 60. Thus, since the determination process is performed by comparing an expected value of a distance that is calculated based on plane information which has been detected in advance against an actually measured distance, the time for performing any new planarity calculation can be eliminated. As a result, a highly-safe image projection apparatus which is capable of rapid determination can be provided.

If a subregion 45 that is scanned by the infrared laser light 4a is within the non-screen region 56, a re-evaluation as to substantial planarity is made after taking distance measurements within the subregion 45, and it is further evaluated whether it is coplanar with the screen region 55. The position of any subregion 45 which is newly evaluated to be coplanar with the screen region 55 is recorded in the screen region storing section 11c, thus permitting image displaying with the laser light 4 for image displaying purposes.

Figure 17:
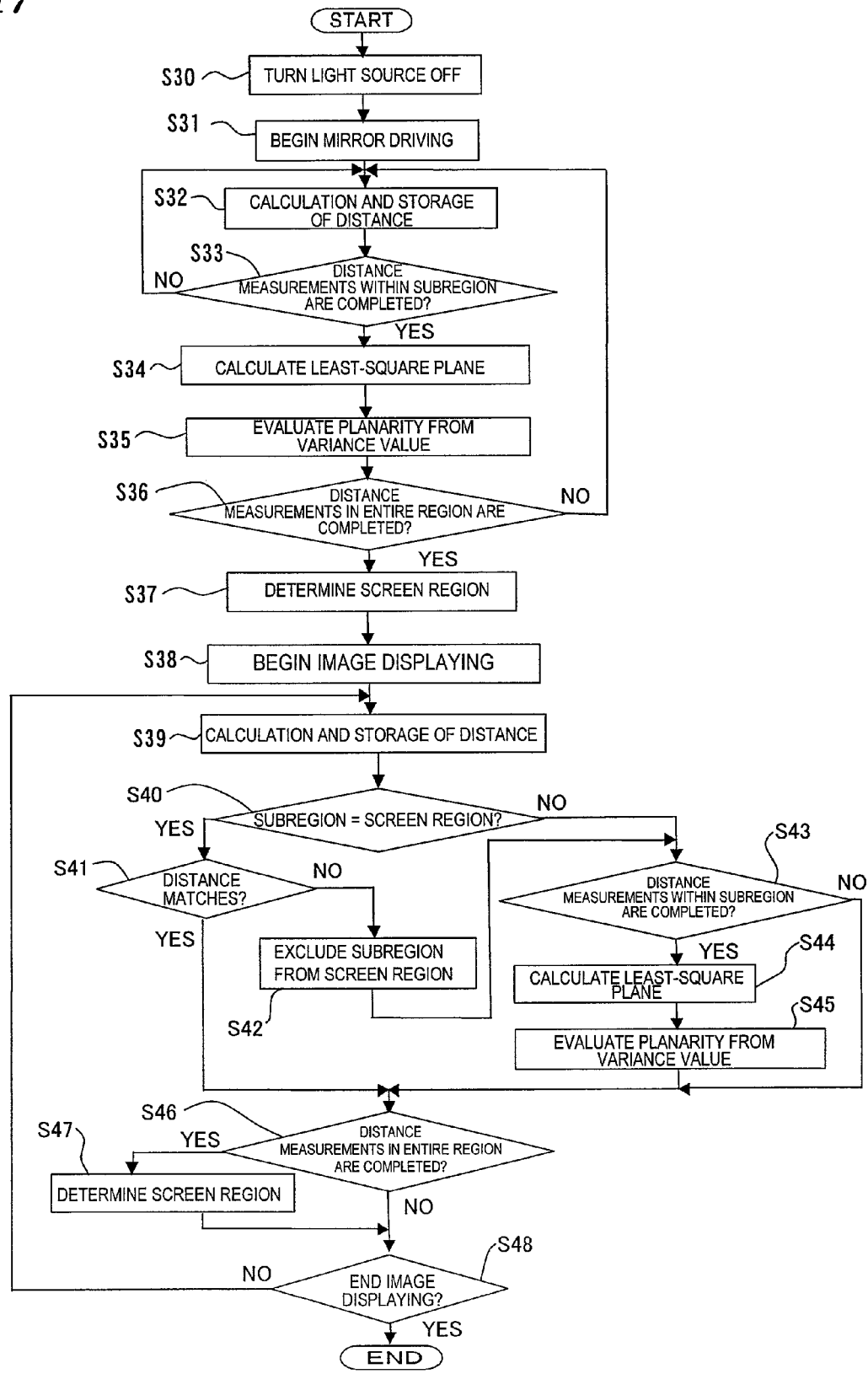
FIG. 17 A flowchart showing operations of the image projection apparatus according to Embodiment 3 of the present invention.

FIG. 17 is a flowchart showing operations of the image projection apparatus 300.

When the image projection apparatus is powered, it is first ensured that projection of the laser light 4 for image displaying purposes is on halt (S30). Next, as soon as the mirror driving section 13 drives the mirror section 6 to begin scanning, projection of infrared laser light 4a is begun (S31), so as to continuously perform scanning of an image-projected region described below. A profile 41 is calculated based on reflected light of the infrared laser light 4a. By using the profile 41 having been subjected to the LPF 15c, a distance is extracted for every plane determination point 50, and is recorded to the distance storing section 15d (S32).

Next, it is determined as to whether distance measurements have been completed with respect to all plane determination points 50 within the subregion 45 (S33) if not completed, control returns to the process of step S32; if a completed subregion 45 exists, a least-square plane calculation is performed based on the coordinates of the plane determination points 50 in the subregion 45 (S34). Next, a level of variance in the lengths of perpendiculars from the plane determination points 50 to the least-square plane is calculated, and if it is lower than a predetermined value, the subregion 45 is determined as planar, and a conditional equation of the plane (least-square plane) is recorded in the plane information storing section 11b (S35). Next, it is determined as to whether the plane determination process has been completed with respect to all positions in the image-projected region (S36). If not completed, control returns to the process of step S32; if completed, a screen region determination is made, and a result of the determination is recorded in the screen region storing section 11c (S37). From this point on, image displaying is begun, the light source 1 being controlled so that the laser light 2 is projected only at the screen position (S38). Control of the light source 1 is performed by referring to the stored contents in the screen region storing section 11c, and is performed independently from and in parallel to the below-described rewriting of the screen region storing section 11c based on scanning with the infrared laser light 4a.

Note that, although the above-illustrated image displaying is begun immediately after completion of a screen region determination, the image displaying step may be assumed only if the screen region remains unchanged after performing several scans of the entire image-projected region and several screen region determinations. The position information of a projection target in any subregion having been determined as substantially planar is updated every time a distance is newly measured, but the light source may begin image displaying in the subregion having been determined as substantially planar only under the condition that a position indicated by its position information remains unchanged for a predetermined period of time. In particular, in the case where the projection direction fluctuates highly frequently, e.g., in the case of a portable-type image projection apparatus, projection of laser light 4 for image displaying purposes is stopped while the projection direction is changing. Since projection of the laser light 4 for image displaying purposes can be begun only after confirming that the projection direction has remained unchanged for a predetermined period of time, i.e., that the image projection apparatus is not moving, a further enhanced safety can be provided. Note that the scanning time for the entire image-projected region is set to e.g. 1/60 seconds, which is a very short time, and hence there is only a short period of time during which the image displaying is stopped even if several scans are conducted. Thus, the influences on image quality can be kept small.

Next, the processes while image displaying is being performed will be described. As soon as a distance measurement with infrared laser light 4a is taken (S39), it is determined as to whether the position of the point of distance measurement is in the screen region or not (S40). If it is not in the screen region, control proceeds to S43, which is a process corresponding to a non-screen region. If it is in the screen region, then it is determined as to whether the measured distance coincides with the distance to the screen 20 (S41). This determination can be made by comparing an expected value of the distance to the screen as calculated from the conditional equation of a plane of the subregion 45 retrieved from the plane information storing section 11b and a projection direction of the infrared laser light 4a against the actually measured distance. If it is determined that reflection is occurring from the screen 20, control proceeds to the process of S46. If it is determined that reflection is not occurring from the screen 20, it is determined that an obstacle 22 has intruded the image-projected region, and therefore the stored contents in the screen region storing section 11c are modified so that the subregion 45 is removed from the screen region 55 (S42). As a result, the projection of laser light 4 for image displaying purposes into this region can be stopped. Furthermore, the process corresponding to a non-screen region is performed.

In the process corresponding to a non-screen region, it is determined whether distance measurements for all plane determination points 50 in the subregion 45 have been completed or not (S43). If completed, a least-square plane calculation is performed (S44). Then, a level of variance in the lengths of perpendiculars from the plane determination points 50 to the least-square plane is calculated, and a plane determination as to whether it is lower than a predetermined value or not is made (S45). Furthermore, if the distance measurements for the entire image-projected region have been completed (S46), a screen region determination process is performed again (S47), so that the stored contents in the screen region storing section 11c are updated to the most recent screen position. A determination is made as to whether there is an instruction to end image displaying (S48). If not, control returns to the process of S39; if there is, the operation is ended.

As described above, according to the present embodiment, an image-projected region is divided into subregions 45 and plane determination is made by using all distance data therewithin, whereby an image projection apparatus which is capable of plane determination with a higher accuracy is provided.

Moreover, since a least-square plane is calculated from the coordinate data of distance measurement points which are taken within a subregion, and planarity is determined based on a variance value, there is provided an image projection apparatus which is capable of highly-accurate plane determination even in the presence of measurement errors.

Moreover, detection of a screen region and a calculation of plane information are performed in advance, and an expected distance value is compared against a measured value in order to detect intrusion of an obstacle. Therefore, there is no need to perform another planarity calculation at the time of detection. As a result, a highly-safe image projection apparatus is provided which is capable of rapid determination.

Moreover, since a screen region is extracted from among those subregions having been determined as planar, and an image is displayed only in the screen region, an even safer image projection apparatus is provided.

Moreover, after a screen region is extracted, an image projection is performed upon confirming that the screen region does not fluctuate. As a result, image projection can be begun in a state where the image projection apparatus itself is not moving, so that an even safer image projection apparatus is provided.

(Embodiment 4)

Figure 18:
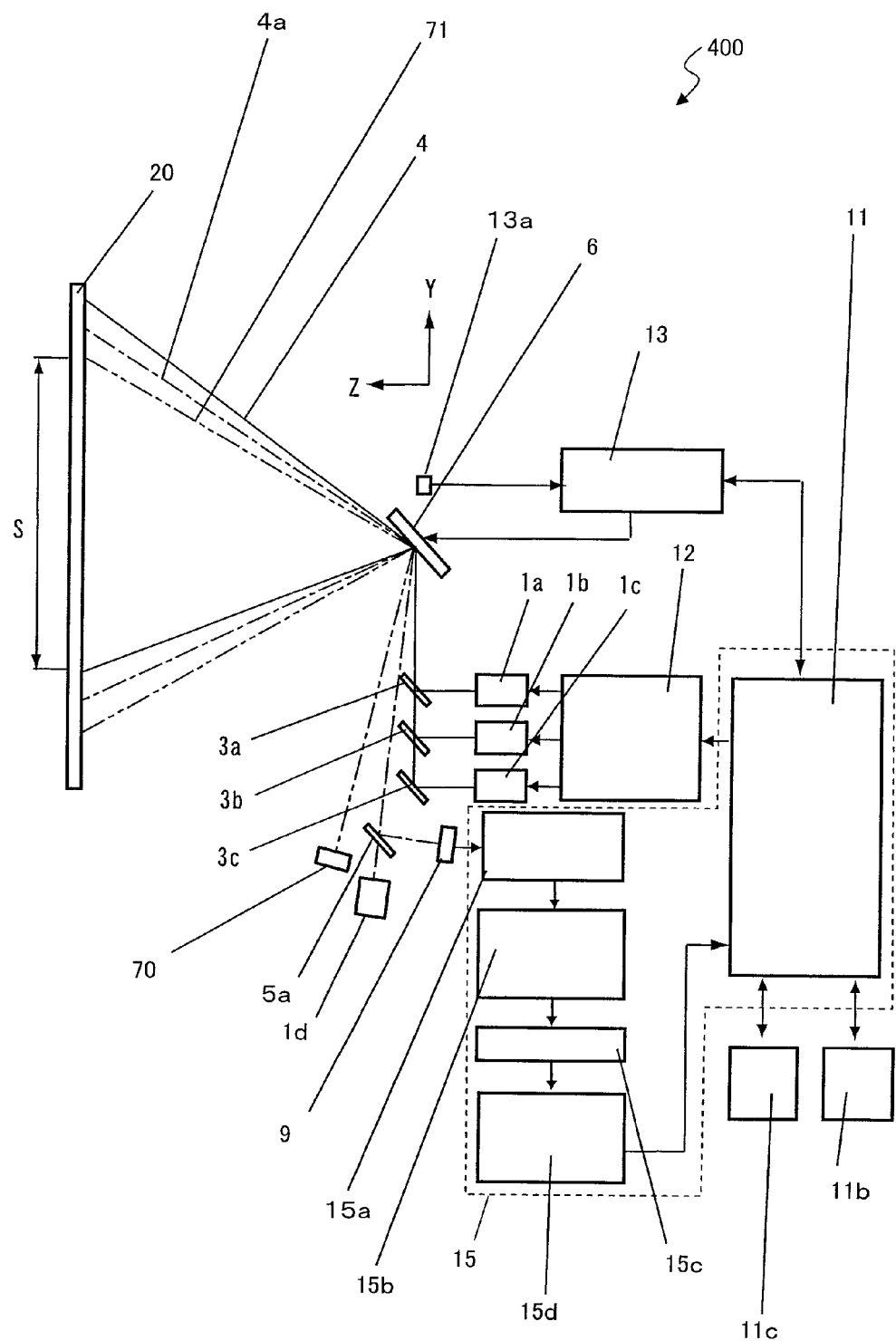
FIG. 18 A diagram showing an image projection apparatus according to Embodiment 4 of the present invention.
Figure 19:
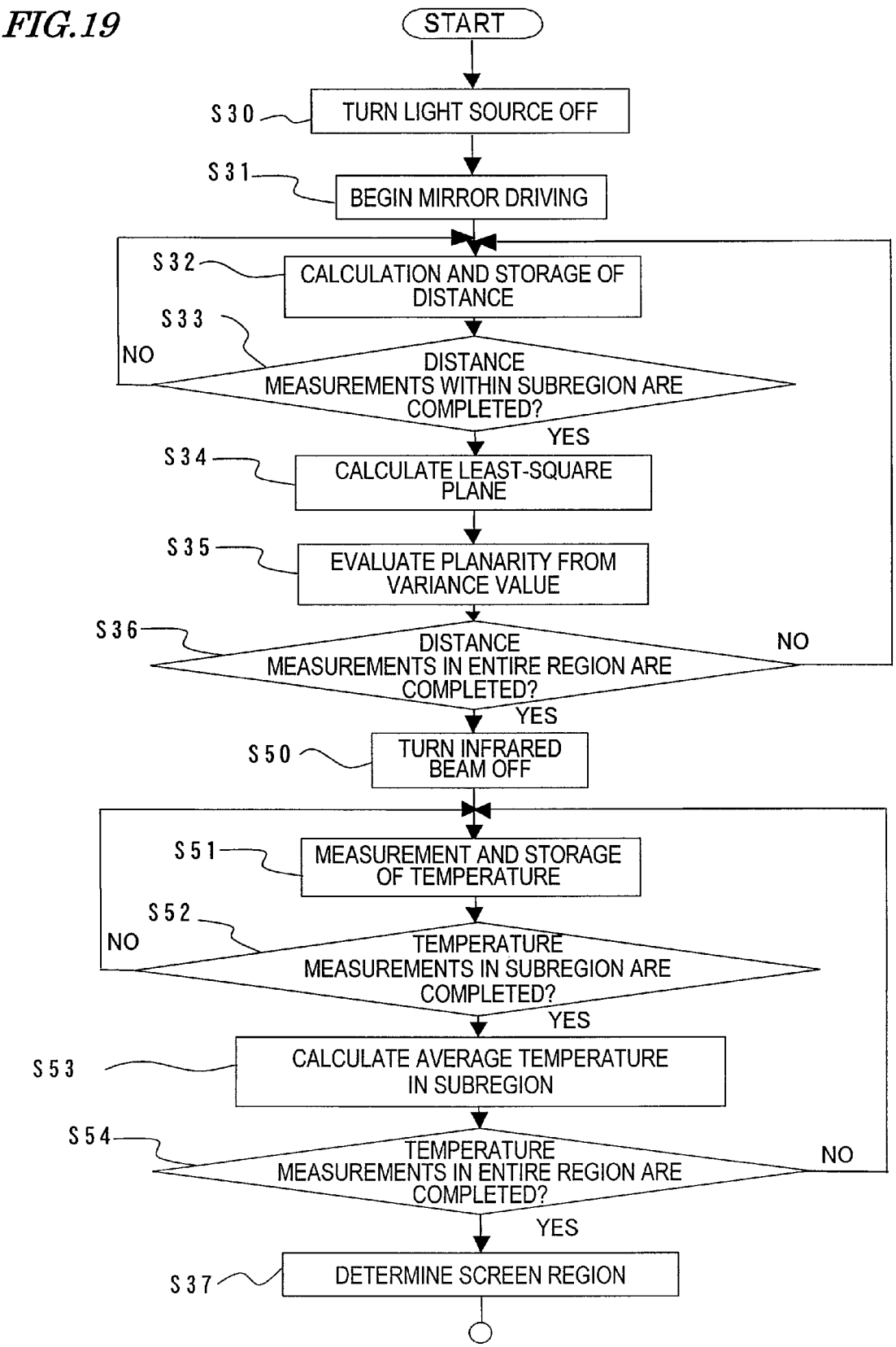
FIG. 19 A flowchart showing operations of the image projection apparatus according to Embodiment 4 of the present invention.
Figure 20:
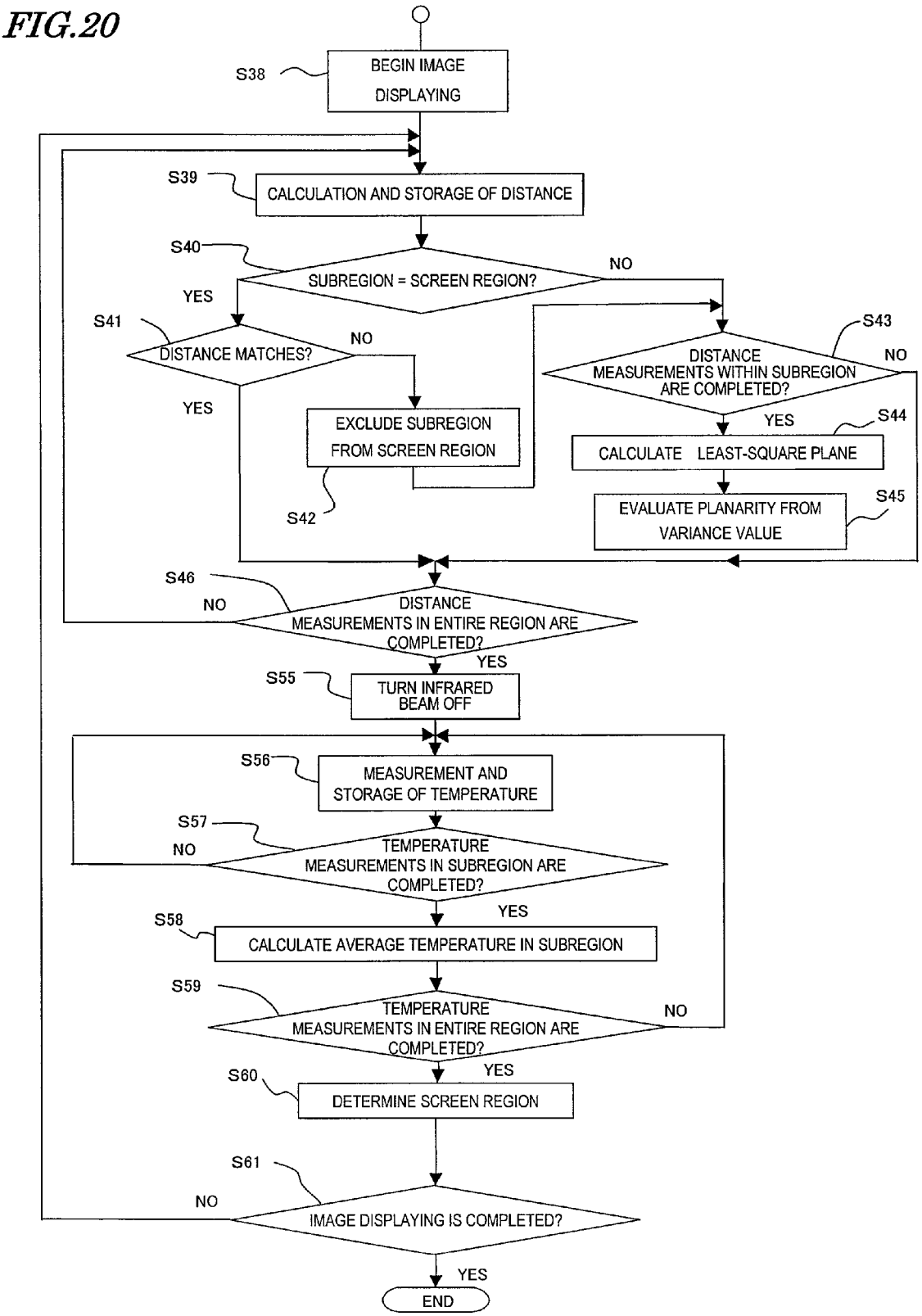
FIG. 20 A flowchart showing operations of the image projection apparatus according to Embodiment 4 of the present invention.

FIG. 18 is a diagram showing an image projection apparatus 400 according to Embodiment 4 of the present invention. FIG. 19 is a flowchart showing operations of the image projection apparatus 400 before image displaying. FIG. 20 is a flowchart showing operations of the image projection apparatus 400 during image displaying.

With reference to FIG. 18, the image projection apparatus 400 includes a temperature measurement section 60. The temperature measurement section 60 is a temperature sensor which detects infrared that is radiated by a screen 5 or a human who has come between the screen 5 and the image projection apparatus in accordance with their temperature or body heat and which measures their temperatures, for example.

A portion of the infrared which is radiated from the screen 5 or the like is reflected by a mirror section 6 along infrared paths 61, and enters the temperature measurement section 60. By measuring temperature while the mirror section 6 scans the display region, it becomes possible to acquire a temperature distribution in the scanned region. Thus, even in a region which has been determined as planar, if a temperature range (e.g., between 30° C. and 40° C.) which is close to the body heat of a human is detected, projection of an image in that region may be stopped. As a result, the possibility of inadvertently performing a projection on a place where the human skin is exposed, e.g., the face or arms, can be further reduced, whereby an image projection apparatus with a further enhanced safety can be provided.

Moreover, when the temperature measurement section 60 measures the temperature of the surface of the projection target, radiation of the infrared laser light 4a for distance measurement purposes is stopped. By taking temperature measurements in a period during which the output of the infrared laser light 4a is stopped, leakage of the infrared laser light 4a into the temperature measurement section 60 can be prevented, and thus the influence on temperature measurements is eliminated for an enhanced temperature measurement accuracy. The planarity determination and temperature measurement may be alternately performed every time the mirror section 6 scans the entire projection region, for example, and after performing two scans, a screen region may be determined based on both the result of planarity determination and the result of temperature measurement.

With reference to FIG. 19, operations of the image projection apparatus 400 will be described more specifically.

The processes of steps S30 to S36 are similar to the processes which have been described with reference to FIG. 17, where infrared laser light 4a is projected and a planarity within a subregion is calculated. In the process of step S36, after scanning of the entire screen has been completed, the infrared laser light 4a is turned OFF (S50). The mirror section 6 again begins scanning from an initial position from which to draw a screen image, while the temperature measurement section 60 takes temperature measurements at the same time, and scanning positions and temperatures at those positions are stored to a memory (not shown) (S51). When temperature measurements in each subregion are finished (S52), an average temperature thereof is calculated (S53) and stored to a memory (not shown). When scanning of the entire screen is completed (S54), among the regions which have been determined as planar in the process of step S35, those whose average temperatures are within a predetermined temperature range (e.g., between 30° C. and 40° C.) are eliminated, and the rest are set as a screen region 55 (S37).

With reference to FIG. 20, continuing from the process of step S37, image displaying is begun (S38). Thereafter, while performing image projection only in the screen region 55, the image projection apparatus concurrently performs planarity calculations and temperature measurements by switching between them for every image frame. The processes of steps S39 to S46 are similar to the processes which have been described with reference to FIG. 17. At step S46, after the scanning of the entire screen has been completed, the infrared laser light 4a is turned OFF (S50). The mirror section 6 begins scanning from an initial position from which to draw a screen image, while the temperature measurement section 60 takes temperature measurements at the same time. The processes of steps S57 to S60 are similar to the processes of steps S52 to S54, and S37, which have been described with reference to FIG. 18. It is determined whether there is an instruction to end image displaying (S61). If not, control returns to the process of S39; if there is, the operation is ended.

As described above, the image projection apparatus 400 includes a temperature measurement section 60, and a further enhanced safety can be provided by suspending image projection in any region where a temperature range (e.g., between 30° C. and 40° C.) near the body heat of a human is detected.

Moreover, by stopping the radiation of infrared laser light 4a for distance measurement purposes during the temperature measurements by the temperature measurement section 60, the influence of the infrared laser light 4a on the temperature measurements is eliminated, whereby the temperature measurement section 60 can attain an enhanced temperature measurement accuracy.

Although the above description illustrates the case where planarity determinations through radiation of infrared laser light 4a and temperature measurements are switched for every scan of one image frame, this is not a limitation. Any construction may be adopted where temperature measurements are not performed during radiation of infrared laser light 4a. For example, a construction may be adopted where one temperature measurement follows a plurality of scans which are made for planarity evaluation.

Industrial Applicability

The present invention is particularly useful in the field of image projection apparatuses that display images by projecting laser light, and provides an image projection apparatus which is safe and which can perform display with an adequate brightness, while realizing downsizing and cost reduction of the apparatus.

The invention claimed is:

1. An image projection apparatus having:
   a light source for outputting visible laser light for displaying an image; and
   a mirror section for reflecting and projecting the laser light having been output from the light source,
   wherein the image projection apparatus displays the image with at least a portion of the projected laser light,
   the image projection apparatus comprising:
   a detection section for detecting at least a portion of the visible laser light returning from a projection direction of the laser light; and
   a calculation section for determining an image displayable region based on the detected visible light, wherein,
   the mirror section reflects at least a portion of the laser light returning from the projection direction of the laser light so as to be led into the detection section.

2. The image projection apparatus of claim 1, further comprising: a modulation section for generating a modulation signal with which to modulate the laser light in accordance with an image signal, wherein,
   the light source outputs the laser light having been modulated in accordance with the modulation signal; and
   the calculation section compares an intensity of the detected light against the modulation signal to determine the image displayable region.

3. The image projection apparatus of claim 2, wherein,
   for the image displayable region, the modulation section generates a modulation signal for causing an image which is in accordance with the image signal to be displayed; and
   for a region other than the image displayable region, the modulation section generates a modulation signal for projecting laser light for detection purposes with which to detect an obstacle.

4. The image projection apparatus of claim 3, wherein, when the calculation section determines that image displaying is permissible in at least a part of the region other than the image displayable region, the modulation section generates a modulation signal for causing an image which is in accordance with the image signal to be displayed in the at least partial region determined as permitting image displaying.

5. The image projection apparatus of claim 3, wherein the laser light for detection purposes is projected in a dot pattern.

6. The image projection apparatus of claim 3, wherein,
   the mirror section displays an image by performing a two-dimensional scanning with the laser light;
   the calculation section performs the process of determining an image displayable region for each scanning line; and
   the modulation section allows a result of the determination process to be reflected on a modulation of the laser light corresponding to a subsequent scanning line.

7. The image projection apparatus of claim 3, wherein,
   the mirror section displays an image by performing a two-dimensional scanning with the laser light; and
   the modulation section modulates the laser light corresponding to a scanning line at an uppermost end of an image frame based on the image displayable region determined when displaying an immediately previous image frame.

8. The image projection apparatus of claim 1, wherein a maximum radiation power of the laser light is a radiation power such that an energy that enters a human eye when the laser light scans the eye is equal to or less than a safe level which is defined by a safety standard.

9. The image projection apparatus of claim 5, wherein,
   a maximum radiation power of the laser light is a radiation power such that an energy that enters a human eye when the laser light scans the eye is equal to or less than a safe level which is defined by a safety standard; and
   a radiation power of the laser light for detection purposes which is projected in the dot pattern is equal to or greater than a radiation power of the laser light for image displaying purposes.

10. The image projection apparatus of claim 3, wherein, at boot of the image projection apparatus, the light source projects the laser light for detection purposes before displaying a image.

11. The image projection apparatus of claim 3, wherein,
the light source outputs laser light of each color of n primary colors (where n is a natural number equal to or greater than 3); and
the light source independently outputs the laser light of each color as the laser light for detection purposes.

12. The image projection apparatus of claim 1, wherein the calculation section determines the image displayable region based further on an intensity of light which is detected by the detection section in a blanking period during which the light source is not lit.

13. The image projection apparatus of claim 12, wherein the blanking period is a horizontal blanking period.

14. The image projection apparatus of claim 12, wherein the blanking period is a vertical blanking period.

15. An image projection apparatus having:
a light source for outputting laser light; and
a mirror section for reflecting and projecting the laser light having been output from the light source,
wherein the image projection apparatus displays an image with at least a portion of the projected laser light,
the image projection apparatus comprising:
a detection section for detecting at least a portion of the laser light returning from a projection direction of the laser light; and
a calculation section for determining an image displayable region based on the detected light, wherein,
the mirror section reflects at least a portion of the laser light returning from the projection direction of the laser light so as to be led into the detection section,
wherein, based on the detected light, the calculation section configured to measure a distance between a projection target onto which the laser light is projected and the image projection apparatus; and
based on the distance, the calculation section configured to detect a substantially planar region in the projection target, and determines the substantially planar region as the image displayable region.

16. The image projection apparatus of claim 15, wherein the calculation section divides into a plurality of subregions a plane corresponding to the projection target as obtained based on the distance, and determines whether each subregion is substantially planar or not.

17. The image projection apparatus of claim 16, wherein the calculation section calculates an imaginary plane within the subregion and determines the subregion to be substantially planar when a level of variance in distance between the imaginary plane and the projection target is equal to or less than a predetermined value.

18. The image projection apparatus of claim 16, further comprising a storing section for retaining position information of the projection target within a subregion determined to be substantially planar, wherein,
when a difference between a newly measured distance and the position information is equal to or greater than a predetermined value, the calculation section re-determines the subregion whose said difference is equal to or greater than the predetermined value to be a non-planar region; and
the light source suspends image displaying in the subregion whose said difference is equal to or greater than the predetermined value.

19. The image projection apparatus of claim 16, wherein the calculation section groups those subregions which are determined to be substantially planar into a plurality of groups, such that, among the subregions which are determined to be substantially planar, subregions that are positioned coplanar are classified into one group, and displays an image in the subregions belonging to a group having a largest area.

20. The image projection apparatus of claim 16, further comprising a storing section for retaining position information of the projection target within a subregion determined to be substantially planar, wherein,
the position information is updated every time the distance is newly measured; and
the light source begins image displaying in the subregion determined to be substantially planar only if a position indicated by the position information remains unchanged for a predetermined period of time.

21. The image projection apparatus of claim 15, wherein the calculation section calculates a profile of the projection target based on the distance, and removes, from the profile, rises and falls that are smaller than predetermined rises and falls.

22. The image projection apparatus of claim 15, wherein,
the calculation section calculates a curvature of the projection target based on the distance; and
the light source does not perform image displaying in a region in which the curvature falls within a predetermined range.

23. The image projection apparatus of claim 22, wherein,
the calculation section calculates a profile of the projection target based on the distance, and removes, from the profile, rises and falls that are smaller than predetermined rises and falls; and
the calculation section calculates a curvature of the projection target based on the profile.

24. The image projection apparatus of claim 15, further comprising a temperature measurement section for measuring a temperature of a surface of the projection target, wherein,
when the temperature in the image displayable region falls within a predetermined range, the light source suspends image displaying in a region in which the temperature falls within the predetermined range.

25. The image projection apparatus of claim 24, wherein the temperature measurement section measures a temperature of the surface of the projection target in a period during which laser light to be output for measuring the distance is stopped.

* * * * *